United States Patent [19]

Smith

[11] Patent Number: 5,173,846
[45] Date of Patent: Dec. 22, 1992

[54] ZERO VOLTAGE SWITCHING POWER CONVERTER

[75] Inventor: David A. Smith, Kowloon, Hong Kong

[73] Assignee: Astec International Ltd., Hong Kong

[21] Appl. No.: 668,587

[22] Filed: Mar. 13, 1991

[51] Int. Cl.⁵ .......................................... H02M 3/335
[52] U.S. Cl. ........................................ 363/20; 363/97; 363/131
[58] Field of Search ................. 363/20, 21, 86, 89, 363/95, 97, 131

[56] References Cited

U.S. PATENT DOCUMENTS

| | | | |
|---|---|---|---|
| 4,417,153 | 11/1983 | Onodera et al. | 363/20 |
| 4,441,146 | 4/1984 | Vinciarelli | 363/20 |
| 4,559,590 | 12/1985 | Davidson | 363/21 |
| 4,618,919 | 10/1986 | Martin | 363/21 |
| 4,809,148 | 2/1989 | Barn | 363/131 |
| 4,870,554 | 9/1989 | Smith | 363/131 |
| 4,870,555 | 9/1989 | White | 363/21 |
| 4,959,764 | 9/1990 | Bassett | 363/20 |
| 4,975,821 | 12/1990 | Lethellier | 363/97 |

OTHER PUBLICATIONS

Bruce Carsten, High Power SMPS Require Intrinsic Reliability, proceedings of the PCI, Mar. 1982, pp. 456–471.

Bruce Carsten, "Design Tricks, Techniques and Tribulations at High Conversion Frequencies", proceedings of the HPFC, Apr. 1987, pp. 139–152.

UNITRODE Integrated Circuits Corporation, datassheet for the "UC1825 High Speed PWM Controller", Linear Integrated Circuits Data and Applications Handbook, Apr. 1990, pp. 4–120 through 4–126.

Primary Examiner—Steven L. Stephan
Assistant Examiner—Jeffrey Sterrett
Attorney, Agent, or Firm—McCubbrey, Bartels, Meyer & Ward

[57] ABSTRACT

A circuit for utilizing the magnetizing current in the transformer of a converter to reset the transformer's core and to provide a zero-voltage-switching condition on the converter's primary switch is disclosed. The power converter includes a transformer having a primary winding and a second winding, the secondary winding being coupled to an output load and a primary switch connected in series between the primary winding and a voltage source. The closing of the primary switch causes energy to be stored in the transformer and the opening of the primary switch causes the energy to be released from the transformer. The utilization circuit includes a series combination of a storage capacitor and a first switch coupled in parallel with one of the transformer's windings to capture the energy released from the transformer. The captured energy is used to reset the transformer's core and to create a zero voltage switching condition across the primary switch. A second switch means is connected in series with the secondary winding of the transformer and is operated to prevent the loading effects of the secondary from interrupting the creation of the zero-voltage switching condition.

25 Claims, 13 Drawing Sheets

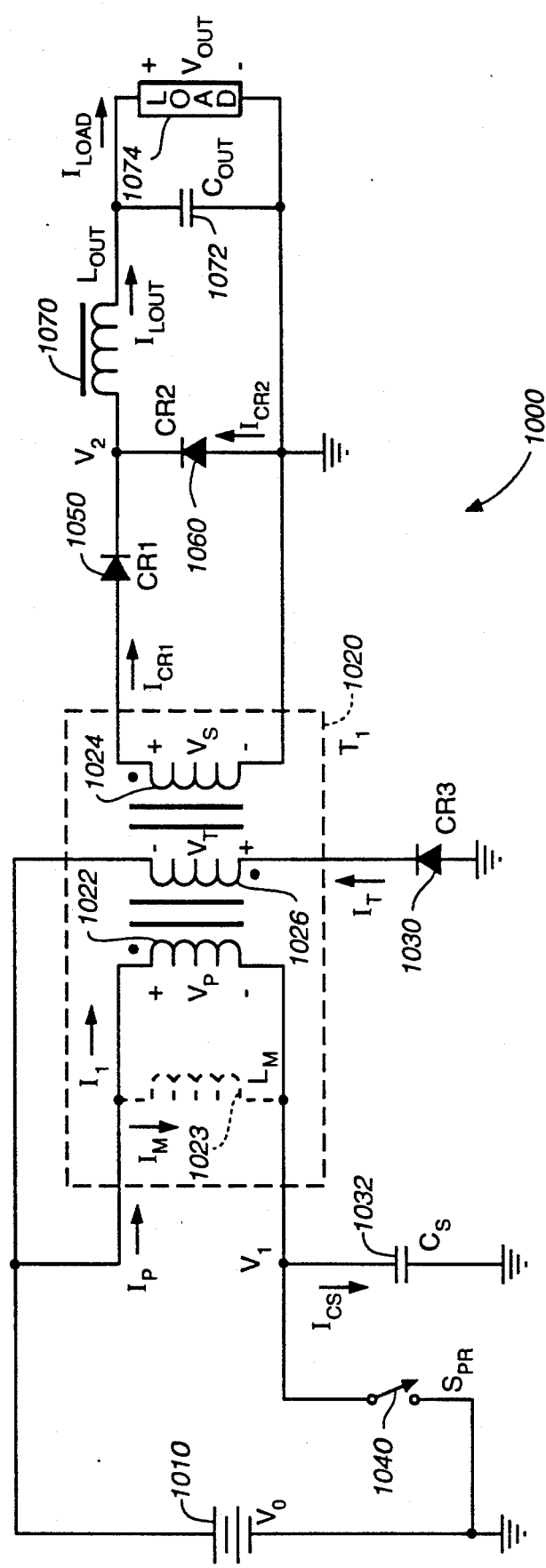
FIG._1
*(PRIOR ART)*

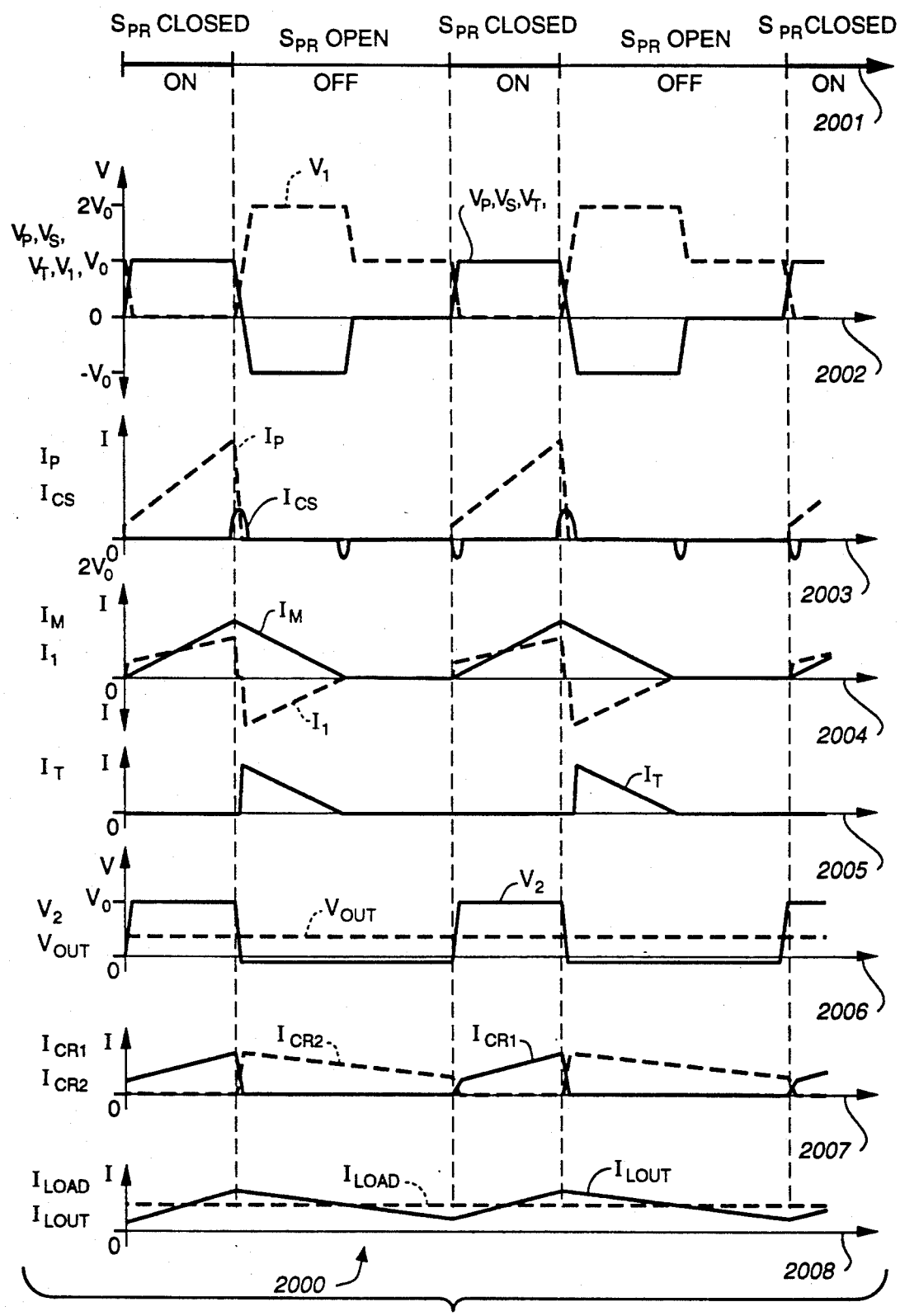
FIG._2
*(PRIOR ART)*

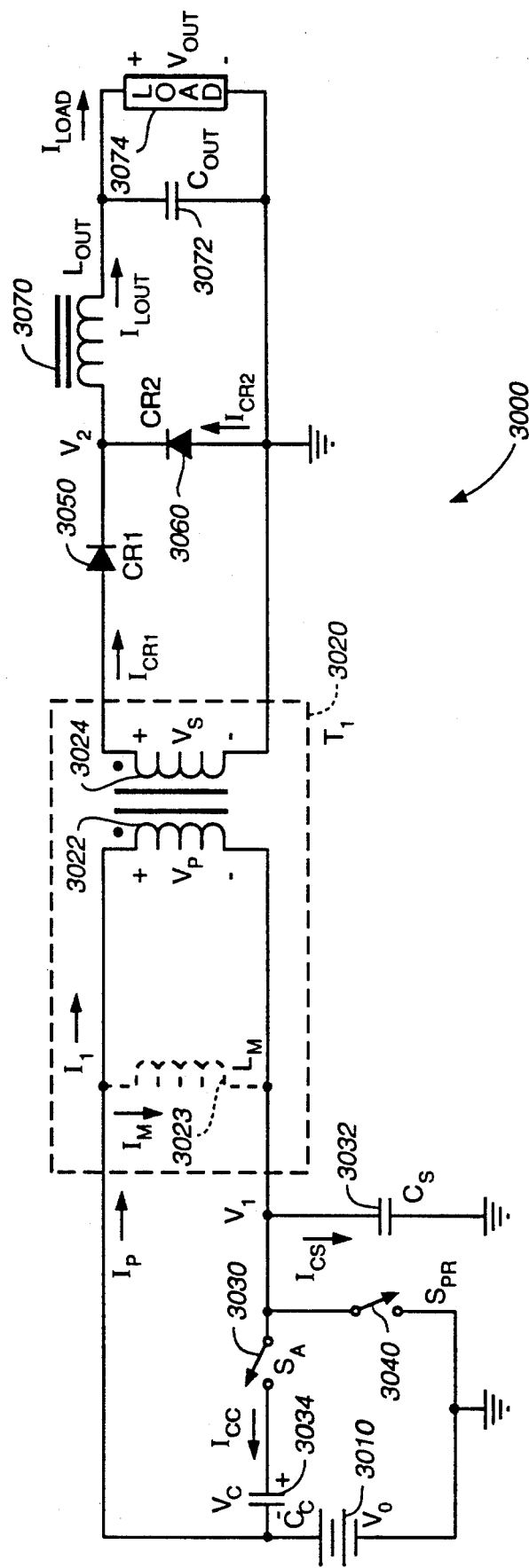
FIG._3
*(PRIOR ART)*

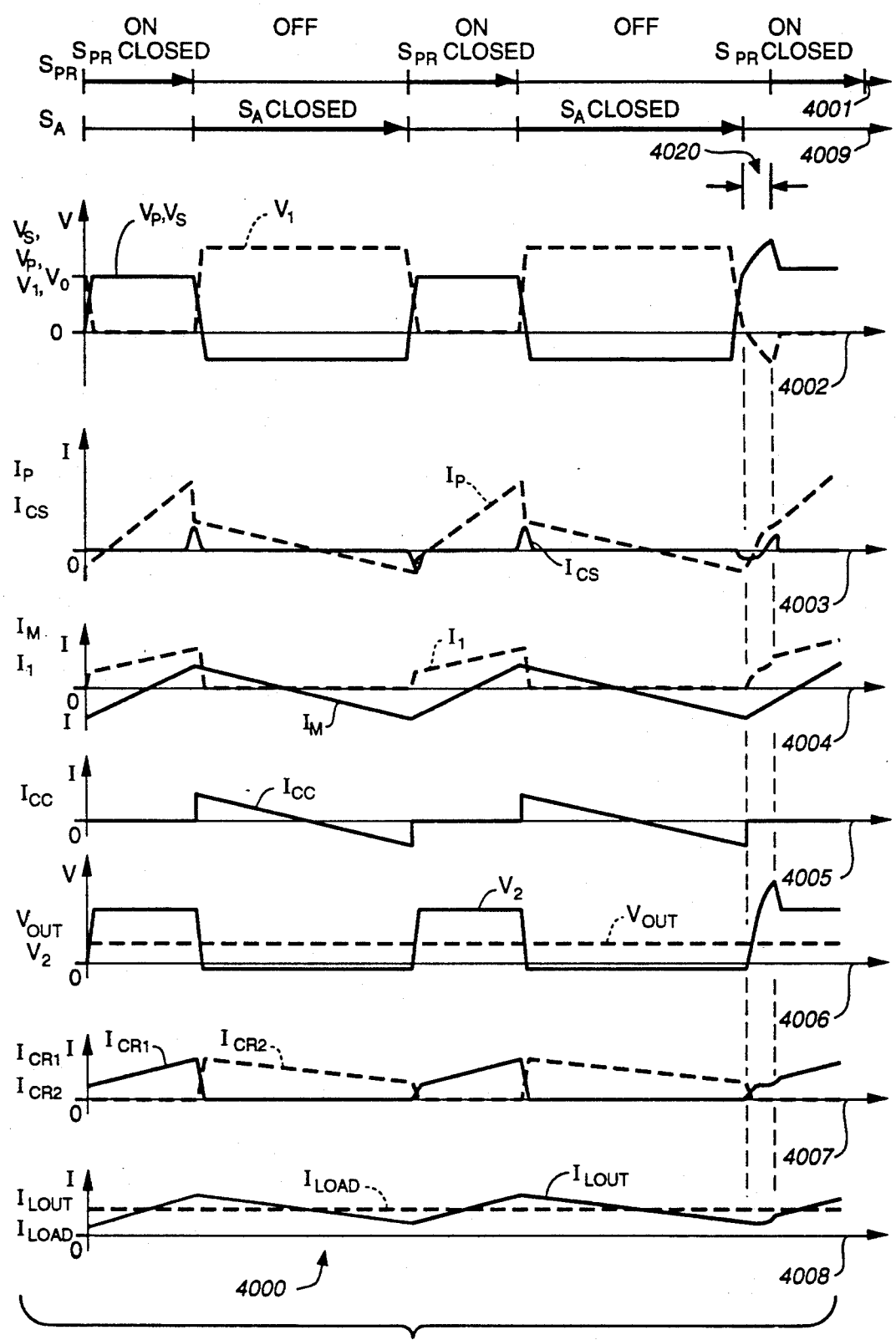
FIG._4

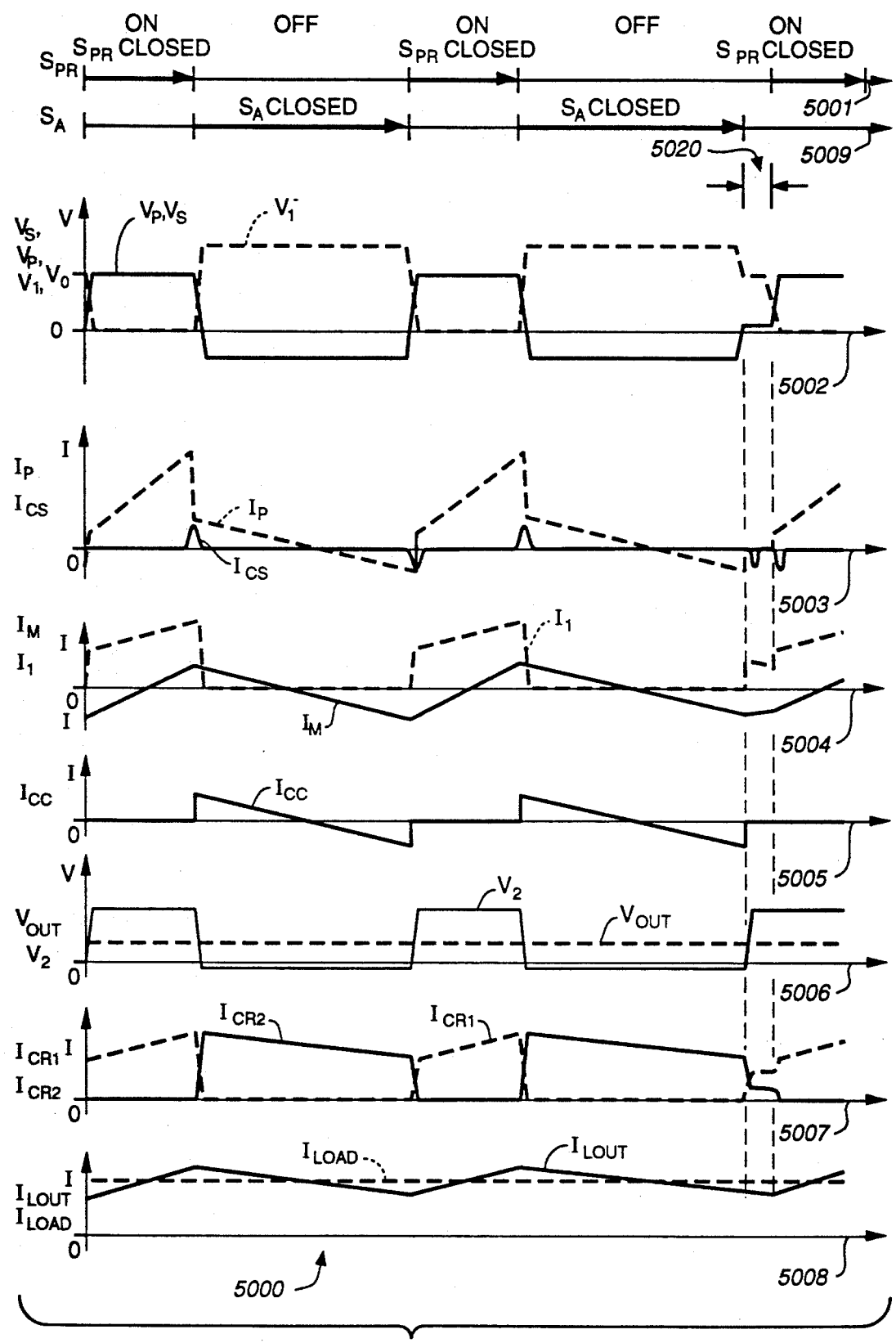
FIG._5

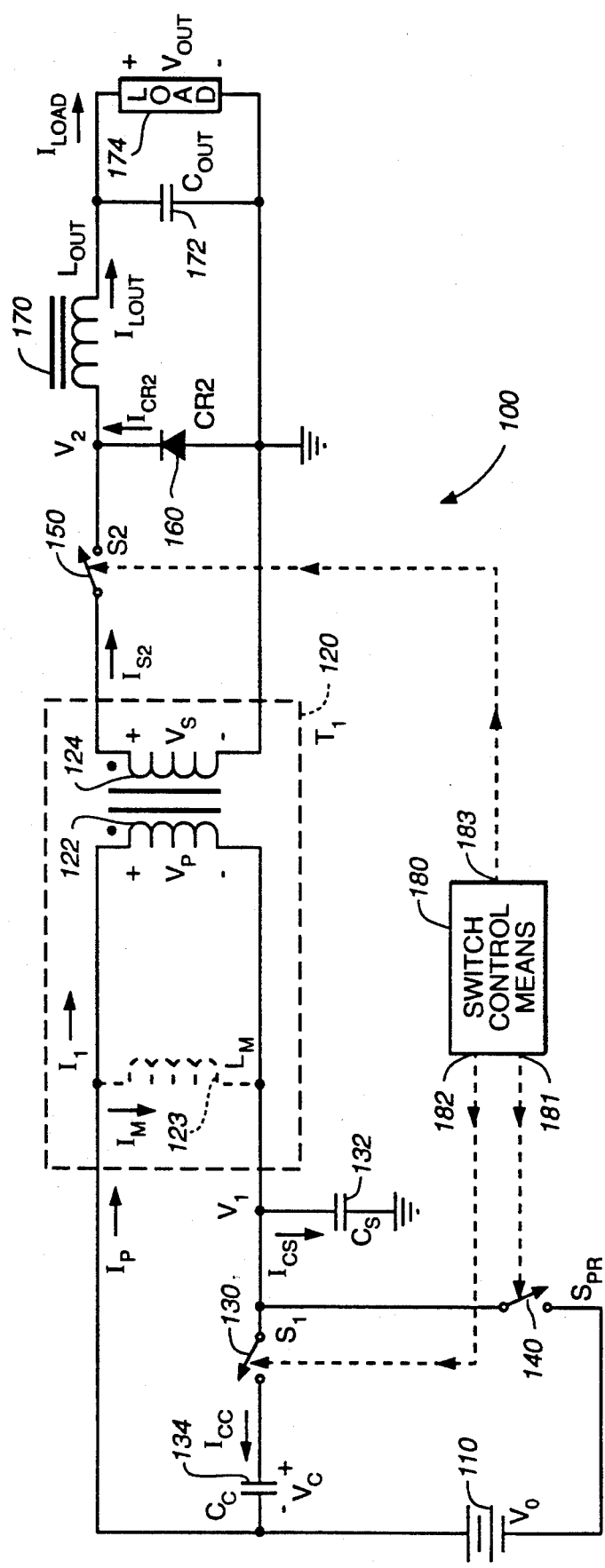
*FIG._6*

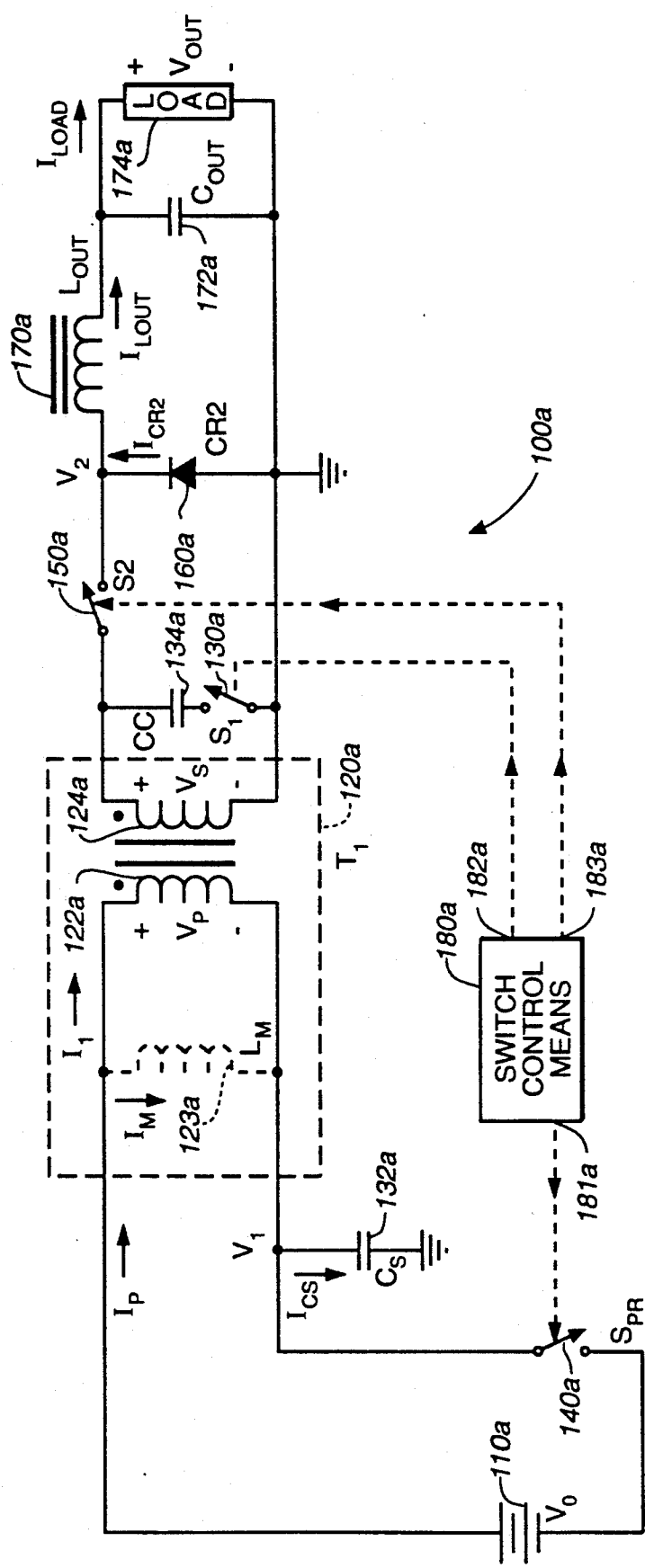
FIG._6A

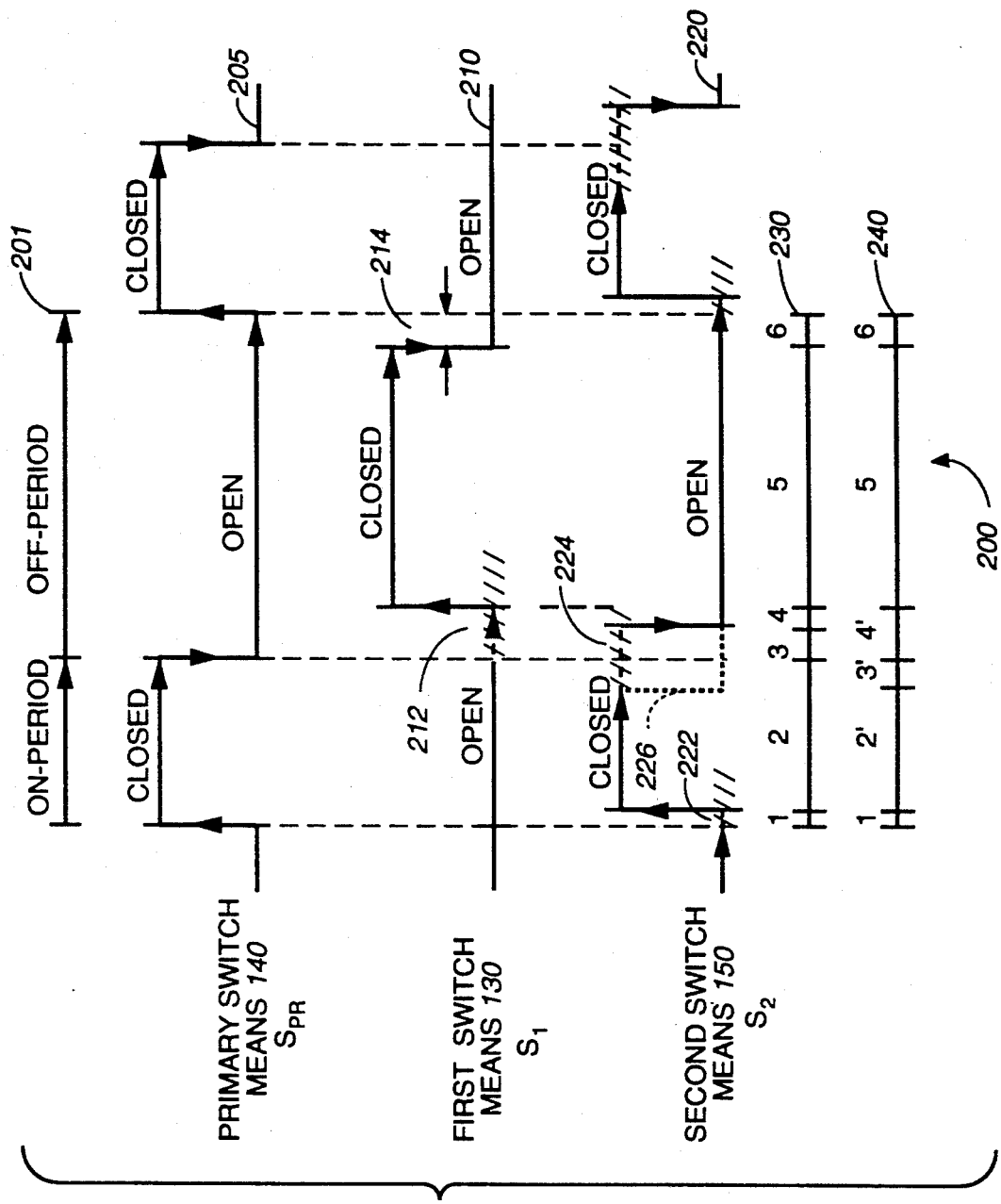
FIG._7

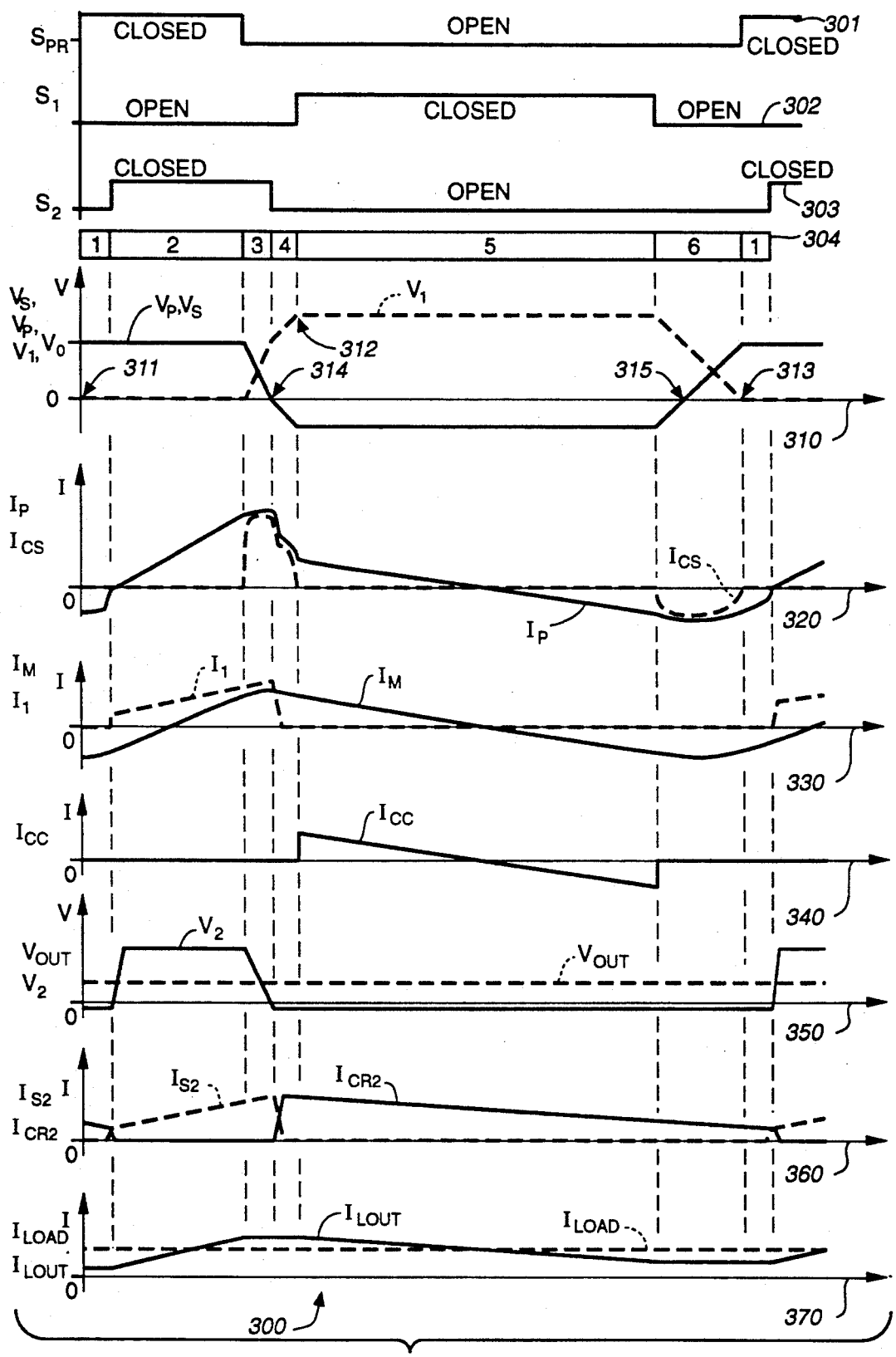
FIG._8

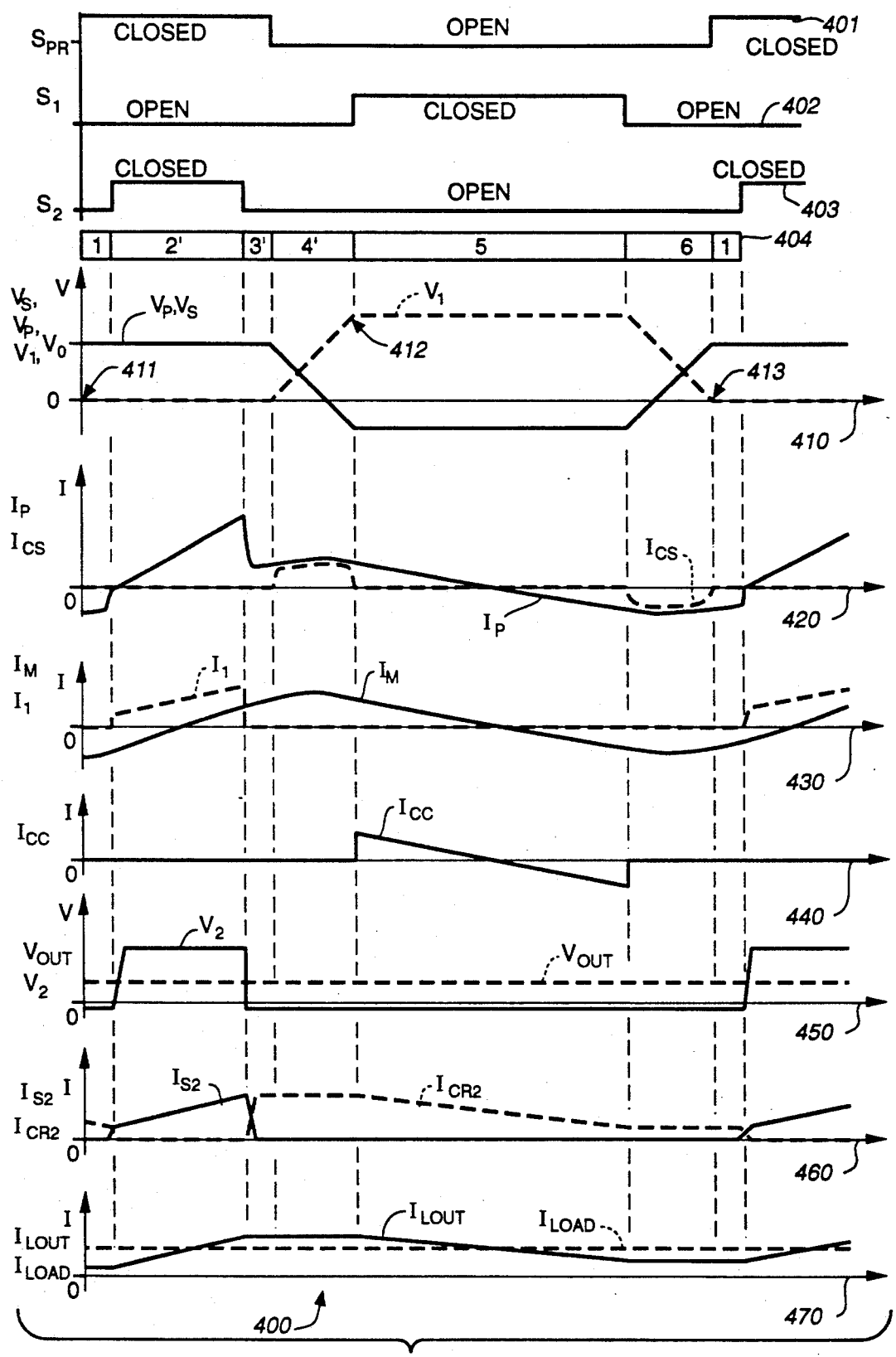
FIG._9

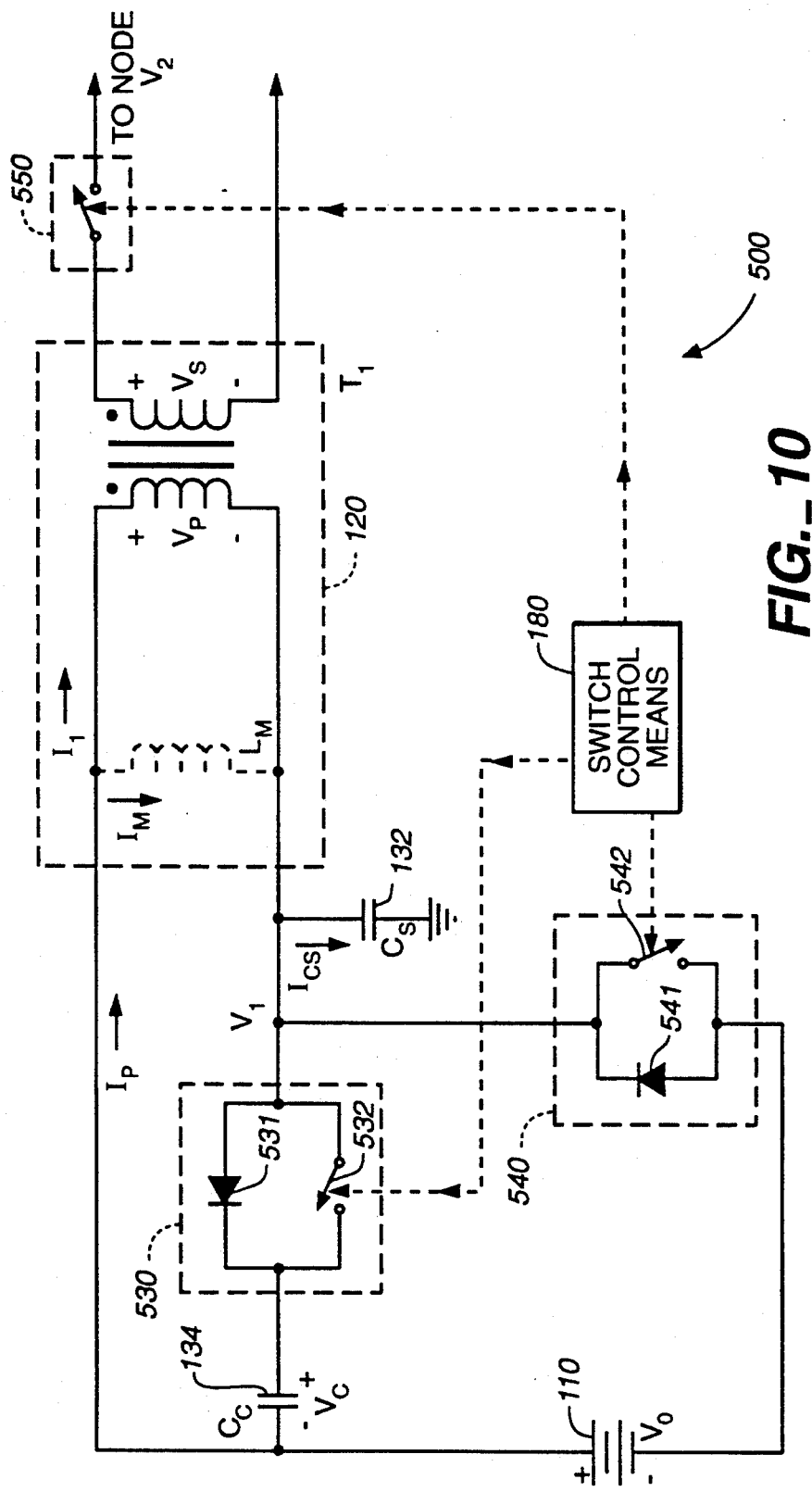
FIG._10

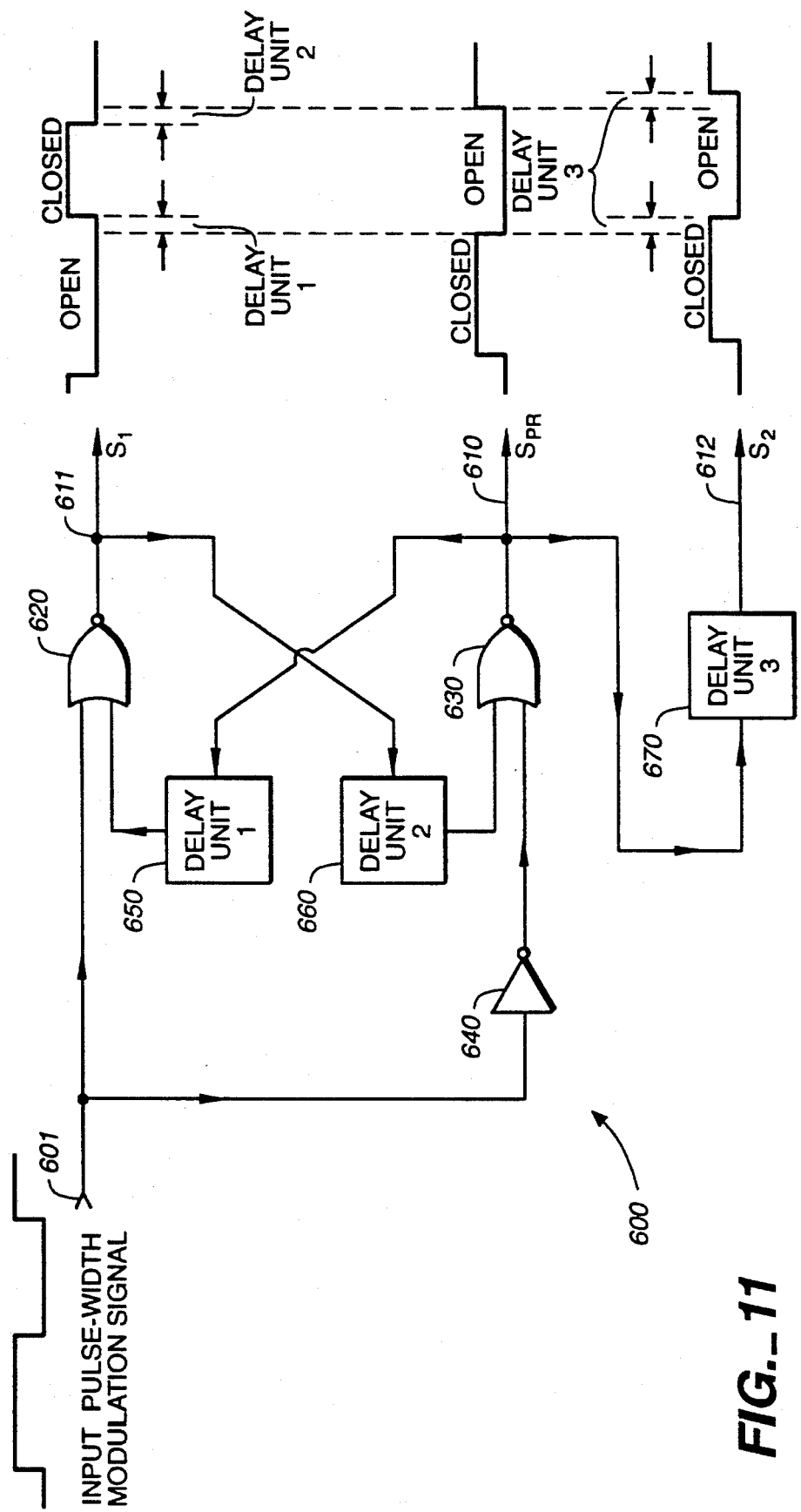
FIG._11

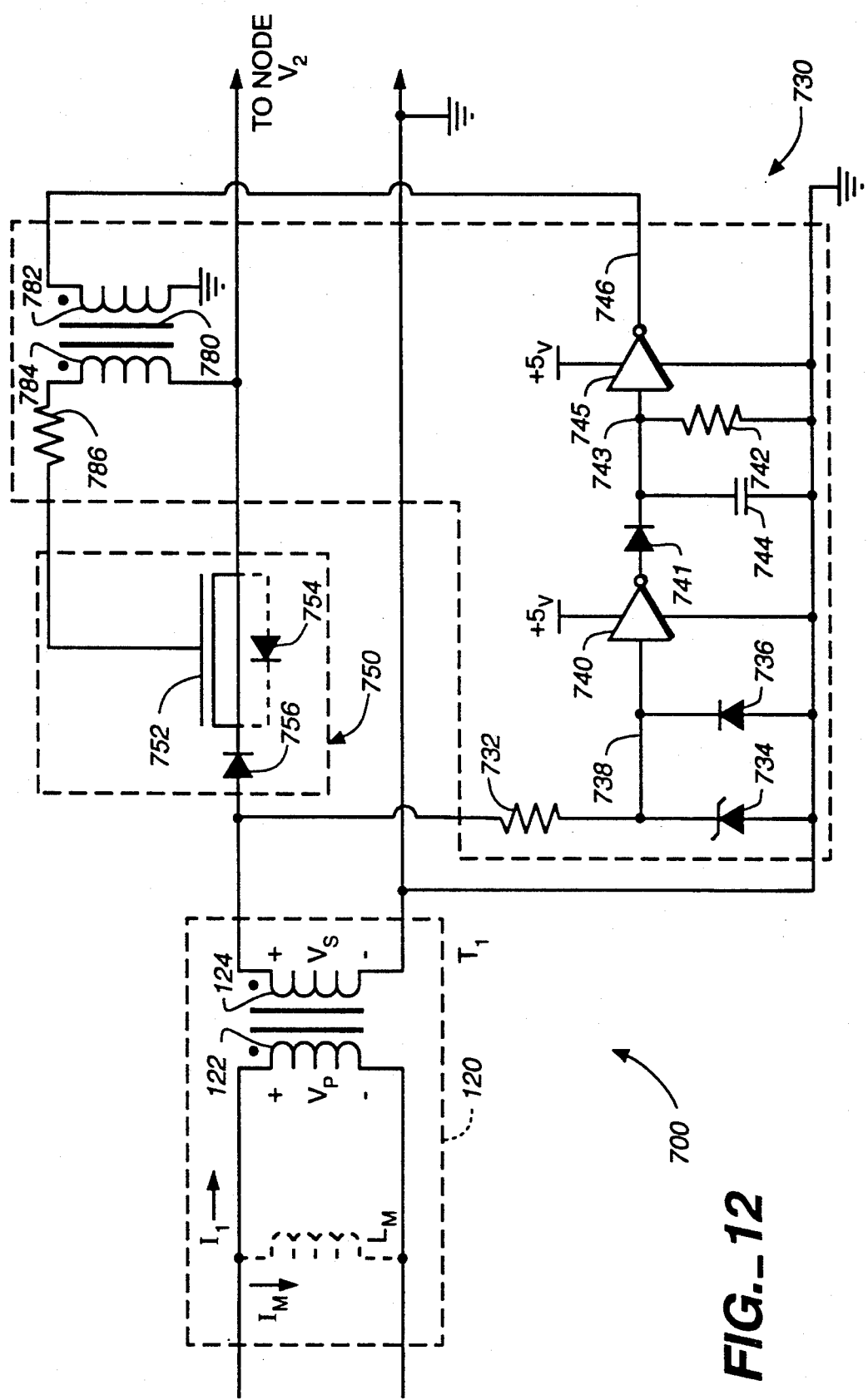
FIG._12

ZERO VOLTAGE SWITCHING POWER CONVERTER

FIELD OF THE INVENTION

The present invention relates to DC-to-DC switching power converters which transfer power from a source supply at a given voltage potential to a destination load at a different voltage potential. In particular, the invention relates to the control of energy in transformers of DC-to-DC forward converters.

BACKGROUND OF THE INVENTION

The forward converter is a common circuit topology used to transform electric energy from a source at a given potential to a destination load at a different potential. Typically, the forward converter requires fewer components than other converter topologies and is smaller and lighter. The standard forward converter comprises a transformer having a primary winding, a secondary winding, and a third winding. The primary winding is coupled to a source of power, usually DC power, via a primary switch and the secondary winding is coupled to a load via two commutating diodes. The primary switch generally comprises a semiconductor switching device such as a field-effect transistor (FET) or a bipolar-junction transistor (BJT). When the primary winding is energized by the closing of the primary switch, energy is immediately transferred to the secondary winding, hence the name forward converter. The third winding is coupled to the power source via a rectifying diode and serves to reset the ferromagnetic core of the transformer when the primary switch is opened. The transformer's third winding provides a current path for discharging the transformer's magnetizing current, which is created when the primary winding is energized.

The standard forward converter is particularly well suited for low and medium power-conversion applications. However, it is not as efficient as other topologies in converting power, particularly in low power applications. The following factors contribute to the lower efficiency of the forward converter.

First, the core-reset operation in the forward converter using the third winding is not as efficient as other core-reset operations in other converter topologies. The rectifier in series with the third winding causes an amount of power dissipation and, more importantly, the addition of a third winding to the transformer increases the transformer's dimensions and thereby reduces the transformer efficiency by increasing the core losses, the resistance of each winding, and the self inductance of each winding.

Second, the forward converter only uses the first quadrant of the transformer's core B-H characteristic, leaving the third quadrant unused. As a result, the size of the transformer must be increased to enlarge the operating range of the first quadrant at the expense of higher core losses and higher winding resistances.

Third, the power dissipation in the primary switch when it is switched on (a turn-on event) is greater than the power dissipation in comparable switches in other topologies. The power dissipation in a switch during a switching event depends upon the product of the voltage across the switch and the current through the switch. In a forward converter, the voltage difference across the primary switch changes from a value equal to the input voltage of the power source to a value near zero when the switch is closed. Additionally, the primary current begins immediately since the forward converter provides current to the secondary winding immediately upon energizing the primary winding. The high input voltage and the instantaneous current flow in the primary switch leads to a high power dissipation loss in the primary switch. The power dissipation losses during switching events become more significant as the switching frequency of the forward converter is increased, as is done to improve the conversion efficiency of the converter's transformer. The direct power dissipation losses become more significant as the switching frequency increases because the duration of each switching event comprises a larger fraction of each switching cycle duration as the switching frequency increases.

The above first and second factors have been addressed in U.S. Pat. No. 4,441,146 issued to Vinciarelli. In U.S. Pat. No. 4,441,146, the third winding is eliminated and replaced by a series combination of a storage capacitor and an auxiliary switch coupled across either the primary or secondary winding. The auxiliary switch is operated counter to the primary switch, i.e., the auxiliary switch is open when the primary switch is closed and closed when the primary switch is open. When the primary switch is open, the storage capacitor and auxiliary switch operate to capture and store the transformer's magnetizing current, which was built up when the primary winding was energized, and then to return the magnetizing current to the transformer in a manner which resets the transformer's core. The elimination of the third winding addresses the first above efficiency factor. Additionally, the returning of the magnetizing current to the transformer creates a condition where the first and third quadrants of the transformer core's B-H characteristic are utilized, thereby addressing the second above efficiency factor.

The third efficiency factor, however, is not addressed by the prior art. In this respect, the present invention provides improvements to the basic forward-converter topology by reducing the power dissipation during switching events, thereby increasing the power-conversion efficiency of the basic forward-converter topology.

SUMMARY OF THE INVENTION

The present invention recognizes that the magnetizing current in the forward converter's transformer is a source of energy that could be used to reduce the voltage across the converter's primary switch to a value near zero volts before the primary switch is closed to energize the primary winding. A reduction of voltage to near zero volts in magnitude (either positive or negative in value) just prior when the primary switch is closed greatly reduces the power dissipation in the primary switch means and is referred to as a zero-voltage-switching condition. The present invention further recognizes that the loading on the converter's secondary winding diverts some or all of the magnetizing current away from the primary winding into the secondary winding in the portion of the converter's switching cycle prior to the closing of the primary switch, thereby preventing such a zero-voltage-switching condition for the converter's primary switch under most operating conditions.

Broadly stated, the present invention encompasses means for isolating the loading effects of the secondary winding from the converter's transformer during the portion of the converter's switching cycle prior to the closing of the primary switch and means for reducing the voltage across the converter's primary switch to a value near zero before the primary switch is closed to energize the primary winding.

More specifically, the present invention applies to a power converter having a transformer, including a primary winding and a secondary winding, the secondary winding being coupled to an output load, and a primary switch means connected in series between the primary winding and a voltage source. The primary switch means causes energy to be stored in the transformer when the primary switch means is closed during an ON-period and causes the energy to be released from the transformer when the primary switch means is open during an OFF-period.

The present invention encompasses circuitry for isolating the loading effects of the secondary winding from the converter's transformer in a time interval preceding the closing of the primary switch means and for utilizing the magnetizing energy stored in the transformer to reduce the voltage across the primary switch to a value near zero before the primary switch means is closed. The isolation and utilization circuitry comprises a storage capacitor and a first switch means coupled in series with the storage capacitor. The series combination of the storage capacitor and the first switch means is coupled in parallel with a selected one of the transformer windings.

The isolation and utilization circuitry further comprises a second switch means connected in series with the secondary winding of the transformer and a switch control means for operating the first and second switch means in relation to the ON-period, and OFF-periods of the primary switch means.

The switch control means closes the first switch substantially when the primary switch means opens and opens the first switch means prior to when the primary switch means closes to create a zero-voltage switching condition across the primary switch means when the primary switch means is next closed. The switch control means opens the second switch means substantially when the primary switch means opens and closes the second switch means after the primary switch means closes. The second switch means remains open in the portion of the converter's switching cycle prior to the closing of the primary switch means such that the loading effects from the secondary winding are isolated from the converter's transformer. The isolation of the loading effects from the secondary winding create a zero-voltage-switching across the primary switch means which the primary switch means is next closed.

One feature of the present invention is that the switch control means further comprises means for closing the first switch means after the primary switch means is opened so as to create a zero-voltage-switching condition across the first switch means.

Another feature of the present invention is that the switch control means further comprises means for operating the second switch means in response to the voltage detected across the secondary winding, thus making the switch control circuitry for the second switch means autonomous from the switch control circuitry for the primary switch means.

Accordingly, it is an object of the present invention to provide greater power conversion efficiencies for the plurality of forward-converter circuit topologies over a greater dynamic range of load current levels.

It is another object of the present invention to provide zero-voltage-switching conditions for the primary switch means.

It is still another object of the present invention to provide the zero-voltage-switching condition over a large dynamic range of load current levels.

It is still another object of the present invention to reduce the voltage and power dissipation stresses on the primary switching means and, hence, allow the use of primary switching means having lower on-resistance, yielding yet lower power dissipation and higher conversion efficiencies.

It is a further object of the present invention to provide zero-voltage-switching conditions for the first switch means.

It is a further object of the present invention to provide an switch control means for controlling the second switch means which operates in an autonomous manner with respect to the means for controlling the primary switch means.

These and other objects of the present invention will become apparent to those skilled in the art from the following detailed description of the invention and from the accompanying drawings.

BRIEF DESCRIPTION OF THE DRAWINGS

FIG. 1 is a circuit diagram of the standard forward converter according to the prior art.

FIG. 2 is a timing diagram of key voltages and currents of the standard forward converter shown in FIG. 1.

FIG. 3 is a circuit diagram of a modified forward converter having a series combination of a storage capacitor and auxiliary switch coupled in parallel with the primary transformer winding according to the prior art.

FIG. 4 is a first timing diagram of key voltages and currents of the modified forward converter shown in FIG. 3 under light loading conditions.

FIG. 5 is a second timing diagram of key voltages and currents of the modified forward converter shown in FIG. 3 under heavy loading conditions.

FIG. 6 is a circuit diagram of an exemplary embodiment of the forward converter according to the present invention.

FIG. 6A is a circuit diagram of a second exemplary embodiment of the forward converter according to the present invention having the active clamp coupled in parallel with the secondary winding of the converter's transformer.

FIG. 7 is a timing-requirement diagram showing the operation of the first and second switch means of the exemplary embodiment of the forward converter shown in FIG. 6.

FIG. 8 is a first timing diagram of key voltages and currents of the exemplary embodiment of the forward converter shown in FIG. 6 under a first switching-event sequence.

FIG. 9 is a second timing diagram of key voltages and currents of the exemplary embodiment of the forward converter shown in FIG. 6 under a second switching-event sequence.

FIG. 10 is a partial block diagram of the forward converter shown in FIG. 6 showing exemplary embodiments of the primary switch means and the first switch means according to the present invention.

FIG. 11 is a circuit diagram of an exemplary embodiment of the switch control means according to the present invention.

FIG. 12 is a partial block diagram of the forward converter shown in FIG. 6 showing exemplary embodiments of the second switch means according to the present invention and of an autonomous switch control means for the second switch means according to the present invention.

DETAILED DESCRIPTION OF THE PRESENT INVENTION

The features of the present invention may be better appreciated and comprehended with a more detailed description of the prior art development of the forward converter. The basic topology of the forward converter is shown at 1000 in FIG. 1 and comprises a transformer 1020 having a primary winding 1022 and secondary winding 1024, a primary switch means 1040 ($S_{PR}$) connected in series with primary winding 1022, and rectifiers 1050 (CR1) and 1060 (CR2) which direct power from secondary winding 1024 to a load 1074. Transformer 1020 further comprises a third winding 1026, which provides a means for resetting the core of transformer 1020, as discussed below in greater detail. A voltage source 1010 having a value of $V_0$ supplies forward converter 1000 with power and a choke inductor 1070 ($L_{OUT}$) and a load capacitor 1072 ($C_{OUT}$) are used to filter the power delivered to load 1074. Additionally, converter 1000 comprises a capacitor 1032 ($C_S$) for representing the stray (parasitic) capacitance associated with primary winding 1022 and switch means 1040. As discussed below, an imaginary inductor is used to model the effects of the magnetizing energy of transformer 1020. The modeling inductor is indicated in phantom as inductor 1023 in FIG. 1 and is coupled in parallel with primary winding 1022. As such, the magnetizing effects of transformer 1020 can be readily analyzed in the form of a magnetizing current. The use of modeling inductor 1023 in this manner is well known to the transformer art and is discussed in greater detail below. Nonetheless, it is important to recognize that inductor 1023 is not a real component of converter 1000 but rather an imaginary modeling component which aids in explaining the characteristic behavior of the magnetizing energy in real transformer 1020.

Certain voltages and currents in converter 1000 are significant and their symbolic notations are detailed below with reference to FIG. 1. The voltage across primary winding 1022 is designated as $V_P$, the voltage across secondary winding 1024 is designated as $V_S$, and the voltage across the third winding 1026 is designated as $V_T$. Each of these winding voltages is referenced such that the positive terminal coincides with the magnetic reference dot shown in FIG. 1. There are two node voltages of significance. At the node coupling the negative terminal of primary winding 1022 to primary switch means 1040, the voltage at this node with respect to ground is designated as $V_1$ and the node itself is referred to as node $V_1$. At the node coupling rectifiers 1050 and 1060 to choke inductor 1070, the voltage at this node with respect to ground is designated as $V_2$ and the node itself is referred to as node $V_2$.

The following currents are significant. The current flowing into third winding 1026 at the positive terminal is designated as $I_T$, the current flowing into primary winding 1022 at the positive terminal is designated as $I_1$, the current flowing into inductor 1023 from voltage source 1010 is designated as $I_M$, and the total primary current flowing into both inductor 1023 and winding 1022 from voltage source 1010 is designated as $I_P$. The current flowing into Capacitor 1032 ($C_S$) from node V is designated as $I_{CS}$. Rectifiers 1050 (CR1) and 1060 (CR2) have the current reference designations $I_{CR1}$ and $I_{CR2}$, respectively, where the current references flow into the anode terminals of each rectifier. The current flowing through choke inductor 1070 ($L_{OUT}$) is designated by the current reference designation $I_{LOUT}$, where the current reference flows toward load 1074. The current flowing through load 1074 is designated by the current reference designation $I_{LOAD}$, where the current reference flows from choke inductor 1070 to ground.

For the purposes of discussion, primary winding 1022 and secondary winding 1024 are taken to have the same number of turns. The dot notations for windings 1022 and 1024 indicate their polarities. As mentioned above, an imaginary inductor 1023 ($L_M$) is indicated, in phantom, in the circuit diagram for transformer 1020 to model the effects of the magnetizing flux and magnetizing current of transformer 1020. As well known in the transformer art, a current must be provided to one of windings of a real transformer to provide the magnetomotive force required to overcome the magnetic reluctance of the transformer's core. This current is known as the magnetizing current and is generally provided to the primary winding of the transformer. Since an ideal transformer does not have any magnetic reluctance, magnetizing currents are not present in an ideal transformer. In a real transformer, the magnetizing current can be electrically modeled by a phantom inductor coupled in parallel with the primary winding of an ideal transformer, as shown by inductor 1023. This is because the magnetizing current is proportional to the time integral of the voltage appearing across the primary winding of the transformer. The inductance value $L_M$ of the phantom modeling inductor 1023 is set to a value representative of the core reluctance of transformer 1020, as well known in the transformer art.

The magnetizing current is a parasitic effect and does not exist in an ideal transformer. As such, the magnetizing current component in the primary winding circuit is not transformed into current in the secondary winding. The current flowing in secondary winding 1024 is related to the current flowing into primary winding 1022 and is not related to the current flowing in inductor 1023. For the purposes of understanding the operation of transformer 1020, primary winding 1022, secondary winding 1024, and third winding 1026 function as an ideal transformer while inductor 1023 functions to account for the magnetizing current in transformer 1020. As such, the above mentioned current $I_P$ represents the current flowing into the primary winding of a real transformer, the above mentioned current $I_M$ represents the component of primary current $I_P$ needed to overcome the reluctance of the real transformer, and the above mentioned current $I_1$ represents the component of primary current $I_P$ which is actually transformed over to the secondary winding of the real transformer. As a point of generality, inductor 1023 can be coupled in parallel with secondary winding 1024 rather than with primary winding 1022 to represent the magnetizing current.

The magnetizing current causes energy to be stored in the transformer's core when the transformer's primary winding is energized by the closing of primary switch means 1040. This energy is stored in the form of magnetic flux in the core and is referred to as the magnetizing flux. The magnetizing flux must be periodically discharged to prevent the flux in the core from reaching a saturation point, at which time the transformer ceases to provide transformer action. As discussed below, the material properties of the core limit the total amount of flux the core can store. The flux energy is discharged by discharging the magnetizing current through one of the transformer's windings. The discharging process is formally known as resetting the core.

To provide for the discharging of the magnetizing energy in forward converter 1000, third winding 1026 of transformer 1020 is coupled in series with a rectifier 1030 and the series combination is coupled across voltage source 1010. Rectifier 1030 is oriented to direct the flow of current into the positive terminal of voltage source 1010 and the reference dot of third winding 1026 is opposite to that of primary winding 1022. As such, current is conducted in third winding 1026 towards voltage source 1010 when the voltage $V_T$ across third winding 1026 is less than or equal to $-V_0$. For the purposes of discussion, third winding 1026 is taken to have the same number of turns as primary winding 1022. The discharging of the magnetizing current through third winding 1023 is detailed below in the discussion of the operation of forward converter 1000.

The operation of the forward converter 1000 is governed by primary switch means 1040 which causes converter 1000 to enter an ON-period when it is closed and to enter an OFF-period when it is open. When primary switch means 1040 is closed, magnetizing current and magnetic energy build up in inductor 1023 of transformer 1020 due to the voltage applied across inductor 1023 by voltage source 1010. The magnetizing current in magnetizing inductor 1023 increases at a constant rate with respect to time (i.e., the waveform of the magnetizing current has a positive linear slope). At the same time, the voltage across primary winding 1022 is also applied to secondary winding 1024 by transformer action and a current in secondary winding 1024 is induced to flow through rectifier 1050 towards load 1074. A current equal in magnitude to the current in secondary winding 1024 is generated in primary winding 1022 by transformer action. Current flow through third winding 1026 is blocked by rectifier 1030 due to the orientation of rectifier 1030 and the polarity of third winding 1026.

When primary switch means 1040 is opened to start the OFF-period, the magnetizing current built up in inductor 1023 flows into capacitor $C_S$, consequently increasing the voltage $V_1$. The current in primary winding 1022 and secondary winding 1024 continue to flow until the voltage $V_1$ reaches a value equal to $V_0$. During this time, the current in primary winding 1022 also flows into capacitor $C_S$ to raise the voltage $V_1$. At the point when the voltage $V_1$ equals $V_0$, the voltage across rectifier 1050 (CR1) becomes negative, thereby stopping the current flow in secondary winding 1024 and primary winding 1022.

The magnetizing current in inductor 1023 continues to flow into capacitor $C_S$ until the voltage $V_1$ equals $2V_0$, at which point the voltage across third winding 1026 is equal to $-V_0$ and a current begins to flow in third winding 1026 via rectifier 1030. The winding voltages $V_P$, $V_S$ and $V_T$ of transformer 1020 are clamped to a value of $V_0$, thus preventing any further charging of capacitor $C_S$. The magnetizing current is then diverted away from capacitor $C_S$ and into primary winding 1022, where it is transformed over to third winding 1026 and discharged at a constant rate into voltage source 1010 ($L_M dI_M/dt = -V_0$) During this time, the waveform of the magnetizing current has a negative, linear slope and the waveform of the current in secondary winding 1024 is constant at zero amperes. The magnetizing current decreases until the magnetic energy built up in transformer 1020 during the ON-period is completely transferred to voltage source 1010 or until primary switch means 1040 is closed again.

The ratio of the duration of the ON-period to the time interval between each successive ON-period is known as the duty-cycle of the converter (e.g., duty-cycle $=T_{ON}/(T_{ON}+T_{OFF})*100\%$). The duty-cycle is adjusted to meet the power requirements of the load, with a higher duty-cycle providing more power to the load. The duration of one ON-period and the subsequent OFF-period is often referred to as the switching cycle. The OFF- period is often referred to as the "fly-back" phase due to the abrupt reversals in the voltages and changes of the currents of the transformer windings. It is also referred to as the "reset" phase since the magnetic energy and flux in the transformer core decreases to zero during this time. The voltage that develops across primary switch means 1040 during the OFF-period is greater than the value provided by voltage source 1010 and is referred to as the "reset" voltage.

Under steady-state conditions, the output voltage $V_{OUT}$ and the duty-cycle of the forward converter are generally related as follows. When choke inductor 1070 continuously provides current to load 1074 throughout the switching cycle, the output voltage $V_{OUT}$ is equal to the input voltage $V_0$ times the duty cycle, as expressed in the form of a fraction (i.e., divided by 100%). This is because the output voltage $V_{OUT}$ adjusts to a voltage level such that the time-integrated voltage applied across choke inductor 1070 during each switching cycle is equal to zero, under steady state conditions. During the ON-period duration, $T_{ON}$, the voltage applied to choke inductor 1070 is ($V_0-V_{OUT}$) volts. During the OFF-period duration, $T_{OFF}$, the voltage applied to choke inductor 1070 is ($-V_{OUT}$) volts. Setting the time-integrated voltage to zero (i.e., $T_{ON}(V_0-V_{OUT})-T_{OFF}V_{OUT}=0$) and solving for $V_{OUT}$ results in $V_{OUT}=V_0T_{ON}/(T_{ON}+T_{OFF})=V_0*$(duty-cycle/100%). In the case where choke inductor 1070 does not continuously provide current to load 1074, due to low load-current demand, the relationship between the duty-cycle and the output voltage is considerably more complex and depends upon the output current level required by load 1074. The derivation and presentation of this more complex relationship are not necessary in order to understand the present invention and enable one of ordinary skill in the art to make and use the present invention. (The derivation and presentation of the more complex relationship may be found in the forward converter switching art.) For the purposes of presenting the present invention and without loss of generality, the exemplary operating conditions presented hereinbelow assume that choke 1070 continuously provides current to load 1074 and makes use of the relationship $V_{OUT}=$(duty-cycle/100%)$*V_0$.

The steady-state waveforms for the key voltages and currents of forward converter 1000 are shown in timing diagram 2000 in FIG. 2. For the purposes of this discussion, each winding of transformer 1020 has the same number of turns and has no parasitic resistance and transformer 1020 is operated in the linear regime of its B-H characteristic. Additionally, each rectifier has a nominal voltage drop for forward conducting current, near zero current conduction for reverse applied voltage and has a nominal amount of reverse-recovery current. To simplify the discussion of forward converter 1000, the output voltage across load 1074 is taken to be constant at a value of one third the input voltage ($V_O/3$). Furthermore, load 1074 is taken to be resistive in nature without loss of generality.

The operation of primary switch means 1040 is shown in graph 2001 in FIG. 2. Graph 2001 is in a form of a time line which indicates the ON-periods where primary switch means 1040 ($S_{PR}$) is closed and the OFF-periods where primary switch means 1040 is open. An exemplary duty-cycle of 33.3%, which is consistent with an output voltage $V_{OUT}$ of $V_0/3$, is shown for primary switch means 1040 in graph 2001. The winding voltages $V_P$, $V_S$ and $V_T$ and the voltage $V_1$ are shown in graph 2002 in FIG. 2. For the primary circuit, the total primary current $I_P$ and the current $I_{CS}$ into capacitor $C_S$ are shown in graph 2003, the magnetizing current $I_M$ in inductor 1023 and the current $I_1$ in primary winding 1022 are shown in graph 2004, and the current $I_T$ in third winding 1026 is shown in graph 2005 in FIG. 2. For the secondary circuit, the output voltage $V_{OUT}$ at load 1074 and the voltage $V_2$ are shown in graph 2006, the currents $I_{CR1}$ and $I_{CR2}$ in rectifiers 1050 (CR1) and 1060 (CR2) are shown in graph 2007, and the current $I_{LOUT}$ in choke inductor 1070 and the current $I_{LOAD}$ in load 1074 are shown in graph 2008 in FIG. 2. In comparing the rectifier currents in graph 2007 against the inductor current $I_{LOUT}$ in graph 2008, it may be seen that the rectifier current $I_{CR1}$ supports the inductor current $I_{LOUT}$ during the ON-periods and that the rectifier current $I_{CR2}$ supports the inductor current $I_{LOUT}$ during the OFF-periods.

During the ON-period, the voltage across all three windings is set by voltage source 1010 at a value of $V_0$, with the voltage $V_1$ across primary switch means 1040 at near zero volts, as shown in graph 2002. The application of $V_0$ across the secondary winding causes rectifier 1050 (CR1) to fully support the current in choke inductor 1070. Via the transformer action of transformer 1020, the rectifier current $I_{CR1}$ is replicated in the current I1 of primary winding 1022, as shown in graph 2004. Also during the ON-period, the magnetizing current $I_M$ increases at a constant rate determined by the voltage applied across inductor 1023 and the magnetizing inductance of inductor 1023, as also shown in graph 2004. The total primary current $I_P$ is equal to the sum of $I_1$ and $I_M$ and is shown in graph 2003.

As switch means 1040 opens to begin the OFF-period, the magnetizing current in inductor 1023 initially flows into capacitor 1032 ($C_S$) and raises the voltage $V_1$ towards twice the input voltage $V_0$. The charging current into capacitor $C_S$ is shown as $I_{CS}$ in graph 2003. Once voltage $V_1$ reaches a value of $V_0$, the current in the primary and secondary windings ceases, as described above, and rectifier 1060 (CR2) supports the current $I_{LOUT}$ of choke inductor 1070. Once voltage $V_1$ reaches $2V_0$ and the transformer winding voltages $V_P$, $V_S$, and $V_T$ reach $-V_0$, the magnetizing current $I_M$ reverses polarity and flows into primary winding 1022 ($I_1$), where it is transformed over to third winding 1026 ($I_T$) and discharged back into voltage source 1010. This process is shown in graphs 2004 and 2005 and occurs during the first part of the OFF-period. The time required to discharge the magnetizing current is roughly equal to the duration of the ON-period because the voltage applied to inductor 1023 during the first part of the OFF-period is equal in magnitude, but opposite in sign, to the voltage applied to inductor 1023 during the ON-period.

During the second part of the OFF-period, the winding voltages $V_P$, $V_S$, and $V_T$ return to zero volts and the voltage $V_1$ return to a value of $V_0$. The currents in the primary circuit and secondary winding 1024 cease while the current in rectifier 1060 continues to support the current $I_{LOUT}$. The second part of the OFF-period may be characterized as dead-time since transformer 1020 is neither providing power to the secondary circuit nor having its core reset. The dead time allows converter 1000 to increase the duty cycle, i.e., increase the duration of the ON-period while decreasing the OFF-period, toward 50% in order to provide more power to load 1074, if needed.

There are several critical operational aspects which affect the reliability and power-conversion efficiency of forward converter 1000. One aspect relates to the magnetic operation of transformer 1020, which is usually constructed with a core of soft ferromagnetic material of negligible hysteresis. Due to physical properties of the ferromagnetic material, the core can only support a maximum amount of magnetic flux density, B. Since the magnetic flux $\Phi$ is proportional to the magnetic flux density B by the number of turns and the cross-sectional area of the winding, the core can only support a maximum amount of magnetic flux and, hence, magnetizing current. This amount is referred to as the saturation flux value. Beyond the saturation flux value, the transformer ceases to operate.

The saturation of magnetic flux limits the amount of power that converter 1000 may provide to load 1074 during each ON-period. To increase the saturation flux value, the number of turns in each winding can be increased or the cross-sectional area can be increased. Either of these increases, however, increases the parasitic resistances of the windings and thereby decreases the efficiency of converter 1000. As noted in U.S. Pat. No. 4,441,146 issued to Vinciarelli, converter 1000 only uses the first quadrant of the transformer's B-H curve and, hence, only uses one half of the transformer's flux range. If both the first and third quadrant of the transformer's B-H curve are used instead of only the first quadrant, the transformer of a forward converter can be re-designed to reduce the winding resistances and thereby increasing the converter's efficiency. Such an approach is taken in the above cited U.S. Pat. No. 4,441,146.

Another operational aspect of forward converter 1000 relates to the voltages and currents of primary switch means 1040 during switching events. Primary switch means 1040 generally comprises a semiconductor device such as a field-effect transistor (FET) or a bipolar-junction transistor (BJT). When switching from the OFF-period to the ON-period, it takes a finite amount of time for the voltage across primary switch means 1040 to decrease to zero as the current through primary switch means 1040 increases, resulting in a large power dissipation in primary switch means 1040. The dissipated power is equal to the product of both the current and voltage and is zero if either quantity is zero. The power dissipated during the switching transitions directly reduces the conversion efficiency by converting electrical energy into heat. In turn, the reliability and lifetime of primary switch means 1040 is reduced by the heating. The present invention addresses this power conversion loss by providing means for driving the voltage across the primary switch means to near zero volts before the primary switch means is closed. The condition whereby the voltage across the primary switch means is driven to zero volts before the primary switch is closed is herein referred to as a zero-voltage-switching condition.

While switching from the ON-period to the OFF-period, it takes a finite amount of time for the current in primary switch means 1040 to decrease to zero as the voltage across the switch means 1040 increases, resulting in a power dissipation in switch means 1040. The power dissipation during this transition is much less than the dissipation in the transition from the OFF-period to the ON-period, typically between one and two orders of magnitude less. The difference is dissipation is related to the properties of the transistor device, either FET or BJT, and an explanation of the difference is not necessary in order to understand the present invention and enable one of ordinary skill in the art to make and use the same.

Another operational aspect of forward converter 1000 relates to the voltage stress on primary switch means 1040 during the OFF-period. During the OFF-period, the voltage across primary winding 1022 reverses and adds with voltage source 1010 to produce a voltage stress on primary switch means 1040 approximately equal twice the input voltage $V_0$. This voltage stress affects the reliability of forward converter 1000 directly and the conversion efficiency indirectly. The indirect effect on efficiency is explained below as follows. Due to the material properties of semiconductor devices, FET and BJT devices can only withstand a predetermined maximum voltage, known as a breakdown voltage, across their conduction terminals before the devices are destroyed. It is well known within the semiconductor device fabrication art that increasing the breakdown voltage of a BJT or FET device requires increasing the "on"-resistance between the conduction terminals of the semiconductor device. The increased "on"-resistance lowers the conversion efficiency by increasing the power dissipation in primary switch means 1040 during the ON-period.

To address the indirect power dissipation losses due to the under-utilization of the core and due to voltage stresses on the primary switch means, a modification to the standard forward converter has been proposed in U.S. Pat. No. 4,441,146 issued to Vinciarelli. This modification does not, however, address the direct power dissipation losses in the primary switch means during transitions between the ON and OFF-periods. Such direct power dissipation losses become more significant as the switching frequency increases since the duration of each switching event comprises a larger fraction of each switching cycle duration as the switching frequency increases. As the present invention builds on the teachings of prior art active clamp circuits, an exemplary such circuit is discussed in greater detail below with reference to FIGS. 3 through 5.

Such a modified forward converter is shown at 3000 in FIG. 3 and is disclosed in an article by B. Carsten, entitled "High Power SMPS Require Intrinsic Reliability," PCI Proceedings, March 1982, pp. 456-471 as well as in U.S. Pat. No. 4,441,146 issued to Vinciarelli. The topology of forward converter 3000 is similar to the topology of forward converter 1000 with the exception that third winding 102 and rectifier 1030 of converter 1000 are replaced by a series combination of a storage capacitor 3034 and an auxiliary switch means 3030. The latter two components are used to control the reset of the transformer core during the OFF-period, as explained below. With the exception of storage capacitor 3034 and auxiliary switch means 3030, each element of converter 3000 is the same as a corresponding element of converter 1000. Consequently, the number designation for each element of converter 3000 is set to be equal to the number designation of the corresponding element in converter 1000 plus a value of two-thousand.

As discussed above with reference to converter 1000, an imaginary inductor is used to model the effects of the magnetizing energy of transformer 3020. The modeling inductor is indicated in phantom as inductor 3023 in FIG. 3 and is coupled in parallel with primary winding 3022. As such, the magnetizing effects of transformer 3020 can be readily analyzed in the form of a magnetizing current. The use of modeling inductor 3023 in this manner is well known to the transformer art and not a real component of converter 3000, but rather an imaginary modeling component which aids in explaining the characteristic behavior of the magnetizing energy in real transformer 3020.

Storage capacitor 3034 and auxiliary switch means 3030 are coupled in series to one another. One terminal of the series combination is coupled to the switched terminal of primary winding 3022 (at node $V_1$) and the other end is coupled to a constant voltage reference, which is the positive terminal of voltage source 3010 in this case. Storage capacitor 3034 and auxiliary switch means 3030 comprise means for discharging the magnetizing current in inductor 3023 during OFF-periods when primary switch means 3040 is open. Additionally, storage capacitor 3034 and auxiliary switch means 3030 comprise means for causing converter 3000 to use the third quadrant of transformer 3020's B-H characteristic. These means are explained below in greater detail.

As in converter 1000, certain voltages and currents in converter 3000 are significant and their symbolic notations are detailed below with reference to FIG. 3. The symbolic notations $V_P$, $V_S$, $V_1$, $V_2$, $I_1$, $I_M$, $I_P$, $I_{CS}$, $I_{CR1}$, $I_{CR2}$, $I_{LOUT}$, and $I_{LOAD}$ shown in FIG. 3 have the same designations and references as the corresponding notations in FIG. 1. Additionally, the current flowing in capacitor 3034 ($C_C$) from switch means 3030 is designated by the current reference designation $I_{CC}$.

As with forward converter 1000, the operation of forward converter 3000 is governed by primary switch means 3040, which causes converter 3000 to enter an ON-period when switch means 3040 is closed and to enter an OFF-period when switch means 3040 is open. Auxiliary switch means 3030 operates counter to primary switch means 3040 by opening when primary switch means 3040 closes and by closing when primary switch means 3040 opens. The operation of converter 3000 is explained in greater detail below with the assumption that the voltage at the positive terminal of capacitor 3034 with respect to ground is greater than $V_0$, which is the voltage value of voltage source 3010.

During the ON-period, when primary switch means 3040 is closed and auxiliary switch means 3030 is open, a voltage of $V_0$ appears across secondary winding 3024 causing a secondary current to flow through rectifier 3050 and a corresponding current to flow in primary winding 3022 due to transformer action. At the same time, a magnetizing current builds up in inductor 3023 at a constant rate due to the application of a constant voltage of $V_0$ across inductor 3023 by voltage source 3010.

When primary switch means 3040 is opened and auxiliary switch means 3030 is closed to start the OFF-period, the voltage across primary winding 3022 and secondary winding 3024 abruptly reverses to a negative value since the voltage at the positive terminal of capacitor 3034 is greater than $V_0$. As a result, the current flow through secondary winding 3024 abruptly stops due to the reversal in the voltage across the secondary winding and the blocking action of rectifier 3050. In response to secondary winding 3024, the current flow through primary winding 3022 also abruptly stops. The magnetizing current, however, continues to flow and is diverted from primary switch means 3040 into storage capacitor 3034 via auxiliary switch means 3030. For the purposes of discussion and without loss of generality, the capacitance of storage capacitor 3034 is taken to be large enough so that the voltage across storage capacitor 3034 does not substantially change during the OFF-period. Since a constant negative voltage is being applied to inductor 3023 during the OFF-period, the magnetizing current $I_M$ decreases at a constant rate, thereby acting to reset the transformer core. If the OFF-period is sufficiently long, the decrease in $I_M$ continues to the point where current $I_M$ reverses direction and flows out of storage capacitor 3034 and into voltage source 3010.

To prevent the core from saturating during steady-state operations, the time-integrated voltage across inductor 3023, and hence across each winding of transformer 3020, should be zero for each switching cycle, otherwise the magnetic flux in the core of transformer 3020 will saturate within a finite number of switching cycles. In the steady-state operation of converter 3000, the voltage $V_C$ across capacitor 3034 is at a value which sets the time-integrated voltage across inductor 3023 to zero during each switching cycle. This value is referred to as the required value for $V_C$ which prevents core saturation and may be determined as follows. During the ON-period duration $T_{ON}$, a voltage of $+V_0$ is applied to inductor 3023 by voltage source 3010. During the OFF-period duration $T_{OFF}$, the voltage applied to inductor 3023 is the negative of the voltage across storage capacitor 3034: $-V_C$. In this case, the time-integrated voltage during each switching cycle is determined as:

$$\text{Time Integrated Voltage} = T_{ON} \cdot V_0 - T_{OFF} \cdot V_C \quad (1)$$

Setting the time integrated voltage to zero and solving for the required value of $V_C$, which sets the time-integrated voltage to zero, results in:

$$V_{CSS} = \frac{T_{ON}}{T_{OFF}} V_0 = \frac{(DC)}{(1 - DC)} V_0 \quad (2)$$

where the symbol $V_{CSS}$ represents the required value of $V_C$ for preventing core saturation during steady state operations and the symbol DC represents the given duty cycle.

To keep the voltage $V_C$ on storage capacitor 3034 at the required value $V_{CSS}$ under the conditions of constant input voltage, constant output voltage, and constant output load current, the flow of charge into storage capacitor 3034 during the first half of the OFF-period must be equal to the flow of charge out of storage capacitor 303 during the second half of the OFF-period so that no net accumulation or depletion of charge occurs on storage capacitor 3034 during the OFF-period. Given that the magnetizing current $I_M$ increases at a constant rate during the ON-period, that $I_M$ decreases at a constant rate during the OFF-period and that $I_M$ is continuous, the waveform for the magnetizing current $I_M$ must be centered around a value of zero amperes in order to prevent a net charge accumulation or depletion on storage capacitor 3034 during the OFF-period. Otherwise, the voltage $V_C$ would shift away from the required $V_{CSS}$ value.

If the $I_M$ waveform is not centered around zero amperes, the voltage $V_C$ departs from the value $V_{CSS}$ in order to shift the $I_M$ waveform so that it is centered around zero amperes. For example, if the $I_M$ waveform is initially shifted upwards and centered around a positive current value, the shifted waveform will cause a net charge to flow into storage capacitor $C_C$, thereby raising the voltage $V_C$. In turn, the higher $V_C$ voltage causes the magnetizing current to decrease at a faster rate during the OFF-period, thereby shifting the $I_M$ waveform down to center the $I_M$ waveform around zero amperes within a finite number of switching cycles. Likewise, if the $I_M$ waveform is initially shifted downwards and centered around a negative current value, the shifted waveform will cause a net charge to flow out of storage capacitor $C_C$, thereby lowering the voltage $V_C$. In turn, the lower $V_C$ voltage causes the magnetizing current to decrease at a slower rate during the OFF-period, thereby shifting the $I_M$ waveform up to center the $I_M$ waveform around zero amperes within a finite number of switching cycles.

During power-up and during changing load conditions, the voltage value $V_{CSS}$ for storage capacitor 3034 is reached by the transient charging or discharging of storage capacitor 3034. If the voltage across storage capacitor 3034 is less than $V_{CSS}$, It takes a longer time duration to reverse the current-flow direction of $I_M$ and, consequently, more current flows into storage capacitor 3034 than flows out during the OFF-period. The net current flow into capacitor 3034 during each switching cycle raises the voltage across storage capacitor 3034 until the voltage $V_{CSS}$ is reached. Likewise, if the voltage on storage capacitor 3034 is greater than $V_{CSS}$, it takes a shorter time duration to reverse the current-flow direction of $I_M$ and, consequently, more current flows out of storage capacitor 3034 than flows in during the OFF-period. The net current flow out of capacitor 3034 during each switching cycle lowers the voltage across storage capacitor 3034 until the voltage $V_{CSS}$ is reached. During this transient charging condition, the waveform for the magnetizing current is not centered around a value of zero amperes.

The energy transferred out of storage capacitor 3034 during the latter part of the OFF-period is recycled to voltage source 3010. The reversal of current flow in the magnetizing current $I_M$ though inductor 3023 serves to reset the magnetic flux in the transformer's core at a point inside the third quadrant of the transformer's B-H characteristic. The utilization of the third quadrant in this manner increases the utilization of the transformer's core and, hence, the structure of transformer 3020 may be redesigned designed to decrease the dissipation losses in transformer 3020, as described above.

The steady-state waveforms for the key voltages and currents of forward converter 3000 are shown in timing diagram 4000 in FIG. 4. For the purposes of this discussion, each winding of transformer 3020 has the same number of turns and has no parasitic resistance and transformer 3020 is operated in the linear regime of its B-H characteristic. Additionally, each rectifier has a nominal voltage drop for forward conducting current, near zero current conduction for reverse applied voltage and has a nominal amount of reverse-recovery current. To simplify the discussion of forward converter 3000, the output voltage across load 3074 is taken to be constant at a value of $V_0/3$. Furthermore, load 3074 is taken to be resistive in nature without loss of generality.

The operation of primary switch means 3040 is shown in graph 4001 in FIG. 4 and the operation of auxiliary switch means 3030 is shown in graph 4009 in FIG. 4. Graph 4001 is in the form of a time line which indicates the ON-periods where primary switch means 3040 ($S_{PR}$) is closed and the OFF-periods where primary switch means 3040 is open. Graph 4009 is also in the form of a time line and indicates when auxiliary switch means 3030 ($S_A$) is closed and when auxiliary switch means 3030 is open. An exemplary duty-cycle of 33.3%, which is consistent with an output voltage $V_{OUT}$ of $V_0/3$, is shown for primary switch means 3040 ($S_{PR}$) in graph 4001.

The winding voltages $V_P$ and $V_S$ and the voltage $V_1$ are shown in graph 4002 in FIG. 4. For the primary circuit, the total primary current $I_P$ and the current $I_{CS}$ into capacitor $C_S$ are shown in graph 4003, the magnetizing current $I_M$ in inductor 3023 and the current $I_1$ in primary winding 3022 are shown in graph 4004, and the current $I_{CC}$ flowing into storage capacitor 3034 is shown in graph 4005 in FIG. 4. For the secondary circuit, the output voltage $V_{OUT}$ at load 3074 and the voltage $V_2$ are shown in graph 4006, the currents $I_{CR1}$ and $I_{CR2}$ in rectifiers 3050 (CR1) and 3060 (CR2) are shown in graph 4007, and the current $I_{LOUT}$ in choke inductor 3070 and the current $I_{LOAD}$ in load 3074 are shown in graph 4008 in FIG. 4. In comparing the rectifier currents in graph 4007 against the inductor current $I_{LOUT}$ in graph 4008, it may be seen that the rectifier current $I_{CR1}$ supports the inductor current $I_{LOUT}$ during the ON-periods and that the rectifier current $I_{CR2}$ supports the inductor current $I_{LOUT}$ during the OFF-periods.

During the ON-period, the voltage across primary winding 3022 and secondary winding 302 is set by voltage source 3010 at a value of $V_0$ with the voltage $V_1$ across primary switch means 3040 at near zero volts, as shown in graph 4002. The application of $V_0$ across the secondary winding causes rectifier 3050 (CR1) to fully support the current in choke inductor 3070. Via the transformer action of transformer 3020, the rectifier current $I_{CR1}$ is replicated in the current $I_1$ of primary winding 3022, as shown in graph 4004. Also during the ON-period, the magnetizing current $I_M$ increases at a constant rate determined by the voltage applied across inductor 3023 and the magnetizing inductance of inductor 3023, as also shown in graph 4004. As discussed above, the magnetizing current during steady-state conditions is centered around a value of zero amperes, as shown in graph 4004. The total primary current $I_P$ is equal to the sum of $I_1$ and $I_M$ and is shown in graph 4003. During the ON-period, auxiliary switch means 3030 is open and, as such, and the current $I_{CC}$ into capacitor 3034 is zero, as shown in graph 4005.

As switch means 3040 opens to begin the OFF-period, auxiliary switch means 3030 begins to close. During this switching transition, the magnetizing current in inductor 3023 initially flows into capacitor 3032 ($C_S$) and raises the voltage $V_1$ towards the voltage on capacitor 3034. Once auxiliary switch means 3030 closes, the magnetizing current in inductor 3023 flows into storage capacitor 3034. As mentioned above, the capacitance value of storage capacitance 3034 is sufficiently large so that the voltage across capacitor 3034 does not substantially change during the duration of the OFF-period. For an exemplary duty-cycle of 33.3%, the steady-state voltage on storage capacitor 3034 is equal to $V_0/2$, where $V_0$ is the value of voltage source 3010. This value is given by equation (2) above.

The application of $-V_0/2$ volts across primary winding 3022 and secondary winding 3024 by storage capacitor 3034 causes rectifier 3060 (CR2) to fully support the current in choke inductor 3070, as shown in graph 4007. As a result, the current in secondary winding 3024 ceases, as shown by $I_{CR1}$ in graph 4007, and the current in primary winding 3022 ceases, as shown by $I_1$ in graph 4004. Additionally, the magnetizing current $I_M$ in inductor 3023 decreases at a constant rate during the OFF-period, as shown by graph 4004. The magnetizing current $I_M$ initially flows into storage capacitor 3023. The rate of decrease in $I_M$ is equal in magnitude to half of the rate of increase in $I_M$ during the ON-period since the magnitude of applied voltage across inductor 3023 during the OFF-period is half the magnitude during the ON-period. Half way through the OFF-period, under steady-state conditions, $I_M$ reverses sign and flows out of storage capacitor 3023. The waveform of $I_M$ during the OFF-period is reflected in the waveforms for the total primary current $I_P$, as shown in graph 4003, and for the storage capacitor current $I_{CC}$, as shown in graph 4005.

Forward converter 3000 has two main advantages as compared with forward converter 1000 shown in FIG. 1. First, the waveform of magnetizing current $I_M$ is centered around zero amperes, indicating that the third quadrant of the transformer core's B-H characteristic is being utilized. This provides a larger range of linearity in the B-H characteristic, and hence the design of transformer 3020 can be optimized to lower the winding resistances and reduce power dissipation, as discussed above. Secondly, the voltage stress applied to the primary switch means 3040 during the OFF-period is reduced compared to that across primary switch means 1040 since the voltage applied to primary switch means 1040 during the OFF-period is equal to $3V_0/2$, assuming a 33.3% duty-cycle, rather than $2V_0$, as is the case for primary switch means 1040 of converter 1000. Forward converter 3000, however, does not address the power dissipation that occurs in primary switch means 3040 between the OFF and ON-periods, as discussed above. As can be seen in graphs 4002 and 4003 of FIG. 4, as converter 3000 switches from the OFF-period to the ON-period, the current $I_P$ through primary switch means 3040 is at a substantial negative value while the voltage $V_1$ across primary switch means 3040 is switching from $3V_0/2$ to zero volts.

To address this problem, an improvement to forward converter 3000 was proposed in 1987 by B. Carsten, "Design Tricks, Techniques and Tribulations at High Conversion Frequencies," HPFC, April 1987, p. 139. The proposed improvement uses the magnetizing current present in inductor 3023 during the end of the OFF-period to reduce the voltage at node $V_1$ by discharging stray (parasitic) capacitor 3032. Under some conditions, the voltage $V_1$ can be reduced to zero volts in this manner before primary switch means 3040 is closed, thereby significantly reducing the power dissipation in primary switch means 3040 during switchingon transitions. Under other conditions, however, the voltage $V_1$ can never be reduced to zero volts before primary switch means 3040 closes. As discussed below, the present invention identifies the causes which prevent zero voltage switching and provides means for overcoming these causes.

In this proposed improvement, a short delay period, or time duration, is introduced between the end of the OFF-period and the beginning of the ON-period where both primary switch means 3040 and auxiliary switch means 3030 remain open. This time period is shown at 4020 in FIG. 4 and is referred to as delay period 4020 for the purposes of this discussion. As can be seen in graph 4004, the magnetizing current $I_P$ through inductor 3023 is negative at the beginning of delay period 4020. Since both switch means 3040 and 3030 are open, no definite voltage is applied across inductor 3023 and primary winding 3022. Under this condition, the magnetizing current $I_M$ begins to flow through stray capacitor 3032, thereby reducing the voltage $V_1$ from $3V_0/2$ towards zero volts.

The magnetizing current continues to reduce the voltage $V_1$ until the voltage $V_1$ reaches a value of $V_0$ At this point, the voltages $V_P$ across primary winding 3022 and $V_S$ across secondary winding 3024 become positive and the secondary circuit begins conducting current through rectifier 3050 ($I_{CR1}$). Via transformer action, a current ($I_1$) flows in primary winding 3022 which is equal in magnitude to the current flowing in secondary winding 3024. This current flow in primary winding 3022 diverts some or all of the magnetizing current away from stray capacitor 3032. If the magnitude of the current in choke inductor 3070 is less than the magnitude of the magnetizing current $I_M$ at this point, a portion of the magnetizing current will continue to flow into stray capacitor 3032 and voltage $V_1$ will continue to be decreased. This portion of magnetizing current is equal to the magnetizing current less the current flowing in choke inductor 3070.

As the voltage $V_1$ is decreased, the applied voltage across primary winding 3022 and secondary winding 3024 increases, thereby increasing the current flow in choke inductor 3070 and secondary winding 3024. In turn, this increase in secondary current reduces the portion of magnetizing current which is flowing through stray capacitor 3032. At some point, the decrease in voltage $V_1$ ends because the current in secondary winding 3024 is increased to the point where it equals the magnetizing current in inductor 3023. Under certain load conditions and duty-cycles, it is possible to decrease the voltage $V_1$ to zero volts or less, thereby facilitating a zero-voltage-switching condition for primary switch means 3024. Such an exemplary case is shown in FIG. 4 where the voltage $V_1$ shown in graph 4002 is decreased to a negative value during delay period 4020.

However, it is also possible that the voltage $V_1$ cannot be reduced to zero volts due to the loading effects on secondary winding 3024. In some cases, the reduction of voltage $V_1$ ends at a positive voltage. More likely, however, the current through choke inductor 3070 is greater than the magnetizing current $I_M$ during the beginning of delay period 4020 and oftentimes throughout delay period 4020. In this case, the magnetizing current decreases voltage $V_1$ only to a value of $V_0$ volts, at which point all of the magnetizing current $I_M$ is diverted into secondary winding 3024, via primary winding 3022, and the voltage $V_1$ is clamped at a value of $V_0$. The remainder of the current flow in choke inductor 3070 is provided by rectifier 3060, which clamps voltage $V_2$ near zero volts. The current conduction in both rectifiers 3050 and 3060 clamps the secondary voltage $V_S$ to zero volts and, consequently, ensures that voltage $V_1$ remains at a value of $V_0$ volts. In this case, no zero-voltage switching is possible. Unfortunately, since forward converters are designed to maximize the current delivered to the load and to minimize the magnitude of magnetizing current, it is rarely possible to achieve a zero-voltage-switching condition because the load current is larger than the magnetizing current during the delay period.

The steady-state waveforms for the key voltages and currents of forward converter 3000 under the conditions where the current through choke inductor 3070 is greater than the magnetizing current during the delay period are shown in timing diagram 5000 in FIG. 5. Timing diagram 5000 comprises graphs 5001 through 5009 and a delay period 5020. Graphs 5001 through 5009 display the same information as graphs 4001 through 4009, respectively, as shown in FIG. 4. Once voltage $V_1$ is decreased to a value of $V_0$ volts at or near the beginning of delay period 5020, the current $I_{CR1}$ in secondary winding 3024 begins to flow, thereby clamping the voltage $V_S$ on secondary winding 3024 to zero volts since rectifier 3060 is still conducting. A voltage of zero volts is now applied to the windings of transformer 3020, and the magnetizing current is prevented from flowing into stray capacitor 3032. Instead, the magnetizing current, shown in graph 5004, is diverted in primary winding 3022, as shown by $I_1$ in graph 5004, which sets the current in secondary winding 3024 equal to the magnetizing current, as shown by $I_{CR1}$ in graph 5007. The remainder of the current $I_{LOUT}$ in choke inductor 3070, as shown in graph 5008, is conducted by rectifier 3060, as shown by $I_{CR2}$ in graph 5007. The voltage $V_1$ is thereby clamped at a value of $V_0$ volts and a zero-voltage-switching condition cannot be achieved.

The above described mechanism which diverts magnetizing current into secondary winding 3024 and resulting voltage clamping of the transformer windings during the delay period have thus far not been discussed nor addressed in the prior art. The present invention has recognized this diversion mechanism and clamping effect as a major hindrance to achieving a zero-voltage-switching condition for primary switch means 3040 in forward converter 3000 under all loading conditions. As discussed below, the present invention seeks to eliminate the diversion of magnetizing current and the resulting voltage clamping during the delay period, thereby permitting voltage $V_1$ to decrease to zero volts to provide a zero-voltage-switching condition for the primary switch means.

The forward converter according to the present invention is shown at 100 in FIG. 6. Forward converter 100 comprises a voltage source 110 ($V_0$) for providing electrical energy, a transformer 120 ($T_1$) having a primary winding 122 and secondary winding 124, and a primary switch means 140 ($S_{PR}$) coupled in series with primary winding 122 and voltage source 110 for selectively coupling energy from voltage source 110 to transformer 120. Forward converter 100 further comprises a storage capacitor 134 ($C_C$) and a first switch means 130 ($S_1$) for selectively controlling the current flow through storage capacitor 134. First switch means 130 and storage capacitor 134 are coupled in series and the resulting series combination is coupled in parallel with either the primary winding of transformer 120 (as shown in FIG. 6) or the secondary winding of transformer 120 shown in FIG. 6A. Additionally, converter 100 includes a capacitor 132 ($C_S$) coupled between the switched terminal of primary winding 122 and ground for representing the combined stray (parasitic) capacitances of primary winding 122, primary switch means 140, and first switch means 130. It may be appreciated that each of primary winding 122, primary switch means 140, and first switch means 130 may include a parasitic capacitance, resulting from the non-ideal elements used in implementing each of these components. The parasitic capacitance of each of these components may, for example, be represented by a parasitic capacitor for each component terminal, each parasitic capacitor being coupled between its respective component terminal and ground. As these capacitances are parasitic in nature, their exact values are not precisely known and may, in fact, vary considerably in manufacturing. In a further embodiment of the present invention, capacitor 132 further comprises a fixed-value capacitor in addition to the parasitic capacitances so as to provide a more predictable capacitance value for capacitor 132, thereby increasing the manufacturing consistency of converter 100.

As discussed above with reference to converters 1000 and 3000, an imaginary inductor is used to model the effects of the magnetizing energy of transformer 120. The modeling inductor is indicated in phantom as inductor 123 in FIG. 6 and is coupled in parallel with primary winding 122. As such, the magnetizing effects of transformer 120 can be readily analyzed in the form of a magnetizing current. The use of modeling inductor 123 in this manner is well known to the transformer art and not a real component of converter 100, but rather an imaginary modeling component which aids in explaining the characteristic behavior of the magnetizing energy in real transformer 120.

For directing and controlling the flow of power from transformer 120 to an output load 174, forward converter 100 further comprises a second switch means 150 coupled in series with said secondary winding for controlling the flow of current to load 174, and a rectifier 160 (CR2) coupled in parallel with the series combination of second switch means 150 and secondary winding 124. Converter 100 further includes a choke inductor 170 ($L_{OUT}$) coupled between second switch means 150 and load 174, and a load capacitor 172 ($C_{OUT}$) coupled in parallel with load 174. The current through load 174 is represented by the symbol $I_{LOAD}$ and, for the purposes of discussion and without loss of generality, is taken to be constant. Choke inductor 170 (LOUT) and load capacitor 172 ($C_{OUT}$) provide means for filtering the power delivered to load 174.

Forward converter 100 further comprises a switch control means 180 for generating signals to control the operation of primary switch means 140, first switch means 130, and second switch means 150. Switch control means 180 comprises a port 181 coupled to primary switch means 140, a port 182 coupled to first switch means 130, and a port 183 coupled to second switch means 150. Port 181 transmits a signal which controls the operation of primary switch means 140, port 182 transmits a signal which controls the operation of first switch means 130, and port 183 transmits a signal which controls the operation of second switch means 150.

Certain voltages and currents in converter 100 are significant and their symbolic notations are detailed below with reference to FIG. 6. The voltage across primary winding 122 is designated as $V_P$, and the voltage across secondary winding 124 is designated as $V_S$. Each of these winding voltages is referenced such that the positive terminal coincides with the magnetic reference dot shown in FIG. 6. There are two node voltages of significance. At the node coupling the negative terminal of primary winding 122 to primary switch means 140, the voltage at this node with respect to the negative terminal of voltage source 110 is designated as $V_1$ and the node itself is referred to as node $V_1$. At the node coupling second switch means 150 and rectifier 160 to choke inductor 170, the voltage at this node with respect to the negative terminal of secondary winding 124 is designated as $V_2$ and the node itself is referred to as node $V_2$.

The following currents in converter 100 are significant. The current flowing into primary winding 122 at the positive terminal is designated as $I_1$, the current flowing into inductor 123 from voltage source 110 is designated as $I_M$, and the total primary current flowing into both inductor 123 and winding 122 from voltage source 110 is designated as $I_P$. The current flowing into stray capacitor 132 ($C_S$) from node $V_1$ is designated as $I_{CS}$ and the current flowing into storage capacitor 134 ($C_C$) from node $V_1$ is designated as $I_{CC}$. The current flowing into second switch means 150 from secondary winding 124 is designated as $I_{S2}$ and the current flowing out of the cathode terminal of rectifier 160 is designated as $I_{CR2}$. The current flowing through choke inductor 170 ($L_{OUT}$) is designated by the current reference designation $I_{LOUT}$, where the current reference flows toward load 174. The current flowing through load 174 is designated by the current reference designation $I_{LOAD}$, where the current reference flows from choke inductor 170 to ground.

For the purposes of discussion and without loss of generality, primary winding 122 and secondary winding 124 are taken to have the same number of turns. The dot notations for windings 122 and 124 indicate their polarities. An inductor 123 ($L_M$) is included, in phantom, in the circuit diagram for transformer 120 to model the effects of the magnetizing flux and magnetizing current of transformer 120, as discussed above. As mentioned above, a magnetizing current must be provided to one of windings of a real transformer to provide the magnetomotive force required to overcome the magnetic reluctance of the transformer's core. For a real transformer, the magnetizing current can be electrically modeled by a phantom inductor coupled in parallel with the primary winding of an ideal transformer, as shown by inductor 123. As such, the above mentioned current $I_P$ represents the current flowing into the primary winding of a real transformer, such as transformer 120, the above mentioned current $I_M$ represents the component of primary current $I_P$ needed to overcome the magnetic reluctance of the real transformer, and the above mentioned current $I_1$ represents the component of primary current $I_P$ which is actually transformed over to the secondary winding of the real transformer.

As with forward converter 3000, the operation of forward converter 100 is governed by primary switch means 140, which causes converter 100 to enter an ON-period when switch means 140 is closed and to enter an OFF-period when switch means 140 is open. First switch means 130 operates substantially counter to primary switch means 140 by closing substantially when primary switch means 140 opens to start an OFF-period and by opening prior to when primary switch means 140 closes to start an ON-period. Second switch means 150 operates substantially synchronously with primary switch means 140 by closing substantially when primary switch means 140 closes and by opening substantially when primary switch means 140 opens. The operation of converter 100 is explained in greater detail below with the assumption that the voltage at the positive terminal of capacitor 134 with respect to ground is greater than $V_0$, which is the voltage value of voltage source 110.

The operations of first switch means 130 and second switch means 150 are discussed in greater detail with reference to a timing diagram shown at 200 in FIG. 7, which shows the timing requirements for the operations of first and second switch means 130, 150 with respect primary switch means 140. A single switching cycle having an ON-period followed by an OFF-period is shown in graph 201. The opening and closing operations of primary switch means 140, which define the ON- and OFF-periods, is shown in graph 205 in FIG. 7. The high sections of graph 205 indicate the time durations where primary switch means 140 is closed and the low sections indicate the time durations where primary switch means 140 is open. The operation and timing requirements for first switch means 130 is shown in graph 210 and the operation and timing requirements for second switch means 150 is shown in graph 220 in FIG. 7.

Shown in graph 210 is a timing window 212 in which switch control means 180 closes first switch means 130. Timing window 212, as well as all other timing windows shown in Timing Diagram 200, is illustrated using a series of parallel skew lines (/). In the preferred embodiment of the present invention, timing window 212 is of a predetermined length and immediately follows the end of the ON-period. Timing window 212 does not preferably intersect with the ON-period. This is because, as discussed in greater detail below, the delay in closing first switch means 130 with respect to the opening of primary switch means 140 may be used to create a zero-voltage-switching condition for first switch means 130.

Also shown in graph 210 is a predetermined time delay 214 in which first switch means 130 is opened before primary switch means 140 is closed. As discussed below in greater detail, the time delay in closing first switch means 130 with respect to the opening of primary switch means 140 in timing window 212 may be used to provide a zero-voltage-switching condition for first switch means 130 and the time delay 214 between the opening of first switch means 130 and the closing of primary switch means 140 provides a zero-voltage-switching condition for primary switch means 140. As shown in graph 220, second switch means 150 is open during time delay 214 and, thereby, prevents the loading on secondary winding 124 from diverting the magnetizing current away from stray capacitor 132.

Shown in graph 220 is a timing window 222 in which switch control means 180 closes second switch means 150. In the preferred embodiment of the present invention, timing window 222 is of a predetermined length and immediately follows the end of the OFF-period. Timing window 222 preferably does not intersect with the OFF-period. This is because, as discussed in greater detail below, the delay in closing second switch means 150 with respect to the closing of primary switch means 140 may be used to allow primary switch means 140 to reach a full conduction state before primary switch means 140 has to conduct the reflected secondary current, thereby preventing an excessive secondary load current from pulling primary switch means 140 out of a zero-voltage switching condition.

Also shown in graph 220 is a timing window 224 in which switch control means 180 opens second switch means 150. In the preferred embodiment of the present invention, timing window 224 is of a predetermined length which starts during the ON-period and ends before the closing of first switch means 130 in timing window 212. Typically, second switch means 150 is opened synchronously with the opening of primary switch means 140. However, as discussed in greater detail below, the opening of second switch means 150 after the opening of primary switch means 140 may be used to direct the current in secondary winding 124, as reflected in primary winding 122, into stray capacitor 132 before first switch means 130 is closed. This reduces the amount of magnetizing current required to charge capacitor 132 and is useful at low duty-cycle conditions where the magnitude of the magnetizing current is small. As a result of conserving the magnetizing current at low duty-cycles, the range of duty-cycles over which a zero-voltage-switching condition for primary switch means 140 can occur is extended.

In the alternative, second switch means 150 may be opened before the opening of primary switch means 140, as shown at the dotted line 226 in graph 220. This opening may be used to reduce the current in secondary winding 124 and the corresponding reflected current in primary winding 122 before primary switch means 140 is opened. In such a case, only the magnetizing current component remains in primary winding 122 when primary switch means 140 is opened, thereby reducing the power dissipation and current stresses on primary switch means 140. The reduction of such stresses is important during high-load (i.e., high duty-cycle) conditions. Therefore, the opening of second switch means 150 in timing window 224 may be varied to minimize the power dissipation losses in primary switch means 140.

Also shown in Timing Diagram 200 is a first switching-event sequence 230 and a second switching-event sequence 240, which are used later with reference to FIGS. 8 and 9 in discussing the operation of converter 100. Sequences 230 and 240 each divides a single switching cycle into six continuous, non-overlapping segments: segments 1, 2, 3, 4, 5, and 6 for sequence 230 and segments 1, 2′, 3′, 4′, 5 and 6 for sequence 240. The boundary of each segment is defined by a switching event in one of the switch means, 130, 140, and 150. Sequence 230 corresponds to the case where second switch means 150 is opened after primary switch means 140 is opened, as shown in window 224, and sequence 240 corresponds to the case where second switch means 150 is opened before primary switch means, 140 is opened, as indicated by line 226.

Exemplary qualitative steady-state waveforms for the key voltages and currents of forward converter 100 under switching-event sequences 230 and 240 are shown in a timing diagram 300 in FIG. 8 and a timing diagram 400 in FIG. 9, respectively. For the purposes of this discussion and without loss of generality, it is assumed that each winding of transformer 120 has the same number of turns and has no parasitic resistance and transformer 120 is operated in the linear regime of its B-H characteristic. Additionally, rectifier 160 has a nominal voltage drop for forward conducting current, a near zero current conduction for reverse applied voltage and a nominal amount of reverse-recovery current. To simplify the discussion of forward converter 100 and without loss of generality, the output voltage across load 174 is taken to be constant at a value of approximately $V_0/3$ and the voltage on storage capacitor 134 is taken to be substantially constant at a value of approximately $V_0/2$. Without loss of generality, load 174 is taken to be resistive in nature and an exemplary duty-cycle of 33.3%, which is consistent with an output voltage $V_{OUT}$ of $V_0/3$, is used for primary switch means 140.

In FIG. 8, the operation of primary switch means 140 is shown in graph 301, the operation of first switch means 130 is shown in graph 302, and the operation of second switch means 150 is shown in graph 303. Graphs 301–303 are each in the form of a time line waveform which indicates that its corresponding switch means is closed when the waveform is high and that its corresponding switch means is open when the waveform is low. Sequence 230 of FIG. 7 is reproduced as sequence 304 in FIG. 8. Likewise, in FIG. 9, the operation of primary switch means 140 is shown in graph 401, the operation of first switch means 130 is shown in graph 402, and the operation of second switch means 150 is shown in graph 403. Graphs 401–403 are each in the form of a time line waveform which indicates that its corresponding switch means is closed when waveform is high and its corresponding switch means is open when the waveform is low. Sequence 240 of FIG. 7 is reproduced as sequence 404 in FIG. 9. In order to more easily show the transitions of key voltages and current during segments 1, 3/3', 4/4' and 6, the timescale during each of these segments is expanded by roughly an order of magnitude with respect the timescale used during segments 2/2', and 5 (i.e., the waveforms are "stretched out" during segments 1, 3/3', 4/4' and 6).

In FIG. 8, the winding voltages $V_P$ and $V_S$ and the voltage $V_1$ are shown in graph 310. For the primary circuit, the total primary current $I_P$ and the current $I_{CS}$ into capacitor $C_S$ are shown in graph 320, the magnetizing current $I_M$ in inductor 123 and the current $I_1$ in primary winding 122 are shown in graph 330, and the current $I_{CC}$ flowing into storage capacitor 134 is shown in graph 340 in FIG. 8. For the secondary circuit, the output voltage $V_{OUT}$ at load 174 and the voltage $V_2$ are shown in graph 350, the currents $I_{S2}$ and $I_{CR2}$ in second switch means 150 and rectifier 160 (CR2) are shown in graph 360, and the current $I_{LOUT}$ in choke inductor 170 and the current $I_{LOAD}$ in load 174 are shown in graph 370 in FIG. 8.

Likewise in FIG. 9, the winding voltages $V_P$ and $V_S$ and the voltage $V_1$ are shown in graph 410. For the primary circuit, the total primary current $I_P$ and the current $I_{CS}$ into capacitor $C_S$ are shown in graph 420, the magnetizing current $I_M$ in inductor 123 and the current $I_1$ in primary winding 122 are shown in graph 430, and the current $I_{CC}$ flowing into storage capacitor 134 is shown in graph 440 in FIG. 9. For the secondary circuit, the output voltage $V_{OUT}$ at load 174 and the voltage $V_2$ are shown in graph 450, the currents $I_{S2}$ and $I_{CR2}$ in second switch means 150 and rectifier 160 (CR2) are shown in graph 460, and the current $I_{LOUT}$ in choke inductor 170 and the current $I_{LOAD}$ in load 174 are shown in graph 470 in FIG. 9.

During segment 1 of sequences 230 (cf., FIG. 8) and 240 (cf., FIG. 9), primary switch means 140 is closed and both first switch means 130 and second switch means 150 are open. As discussed below, the voltage across primary switch means 140 has been driven to substantially zero volts in the preceding segment, segment 6, and a zero-voltage-switching condition exists across primary switch means 140 when it closes. The zero-voltage-switching condition is shown at 311 and 313 of graph 310 in FIG. 8 and at 411 and 413 of graph 410 in FIG. 9. During segment 1, a voltage of $V_0$ appears across primary winding 122, secondary winding 124, and magnetizing inductor 123. In this segment, only the magnetizing current $I_M$ flows in inductor 123 and primary switch means 140, since second switch means 150 is open. The magnetizing current increases at a constant rate and, as in converter 3000, increases from a negative value.

In a preferred embodiment of the present invention, primary switch means 140 comprises a transistor switching device and the duration of segment 1 is sufficiently long to allow the transistor switching device to reach a full conducting state (i.e., lowest conducting resistance) after being switched on at the beginning of segment 1. The conduction of current in secondary 124 is held off until segment 22', at which time the transistor switching device of primary switch means 140 has lowered its ON-resistance to the point that the addition of the reflected secondary current will not substantially raise the voltage across the device's conducting terminals and, hence, will not increase the power dissipation in the device.

During segment 2 of sequence 230 (cf., FIG. 8) and segment 2' of sequence 240 (cf., FIG. 9), second switch means 150 is closed. During segments 2 and 2', the voltage of $V_0$ appearing across secondary winding 124 and the closing of switch means 150 causes a current to flow through secondary winding 124 and a corresponding current to flow in primary winding 122, due to transformer action. The magnetizing current in inductor 123 continues to increase at a constant rate due to the application of a constant voltage of $V_0$ across inductor 123 by voltage source 110. During this segment, power is transferred to the secondary circuit from the primary circuit.

In sequence 230 (cf., FIG. 8), the power transfer continues until primary switch means 140 is opened, when segment 3 begins. During segment 3, the magnetizing current $I_M$ flows into stray capacitor 132, shown in FIG. 6. This flow raises the voltage $V_1$ and, at the same time, lowers the voltage across primary winding 122 and secondary winding 124. The current in secondary winding 124 is governed by choke inductor 170 and continues to flow because the voltage across secondary winding 124, $V_S$, continues to be positive. The positive value for $V_S$ prevents rectifier 160 from conducting the current in choke inductor 170. As a result, the secondary current continues to be reflected in primary winding 122, which adds constructively with the magnetizing current $I_M$ to charge stray capacitor 132.

The voltage across stray capacitor 132 continues to rise during segment 3 (cf., FIG. 8) until it reaches a value of $V_0$ volts, at which time second switch means 150 is opened to start segment 4. If second switch means 150 is not opened when the voltage $V_1$ across stray capacitor 132 reaches $V_0$ volts, the voltage $V_S$ across secondary winding 124 would be clamped to substantially zero volts by rectifier 160. As a result, the voltage $V_1$ would be clamped to $V_0$ volts and the magnetizing current would be diverted to secondary winding 124. In segment 4, the magnetizing current $I_M$ continues to charge stray capacitor 132 until the voltage $V_1$ substantially reaches the voltage on the positive terminal of storage capacitor 134 at the end of segment 4. First switch means 130 may then be closed with zero volts across its conduction terminals, a zero-voltage-switching condition, to start segment 5. In FIG. 8, the zero-voltage-switching condition for switch means 130 is shown at 312 in graph 310, where voltage $V_1$ reaches the voltage on the positive terminal of storage capacitor 134. For an exemplary duty-cycle of 33.3%, the voltage on the positive terminal of storage capacitor 134 is equal to $3/2V_0$.

For sequence 240 (cf., FIG. 9), the power transfer continues during segment 2, until second switch means 150 is opened. The opening ends segment 2, and begins segment 3'. During segment 3', the reflection of secondary current in primary winding 122 ends. The magnetizing current $I_M$, however, continues to flow and increases in value due to the continuing application of $V_0$ volts across magnetizing inductance 123. Nonetheless, the current in primary switch means 140 is significantly reduced so that primary switch means 140 may be opened with lower current stresses and lower power dissipation. This opening of primary switch means 140 ends segment 3' and begins segment 4'.

During segment 4' (cf., FIG. 9), the magnetizing current $I_M$ flows into stray capacitor 132, which raises the voltage $V_1$. Segment 4' ends when the voltage $V_1$ substantially reaches the voltage on the positive terminal of storage capacitor 134. At the end of segment 4', first switch means 130 may be closed with zero volts across its conduction terminals, a zero-voltage-switching condition, to start segment 5. In FIG. 9, the zero-voltage-switching condition is shown at 412 in graph 410, where voltage $V_1$ reaches the voltage on the positive terminal of storage capacitor 134. For an exemplary duty-cycle of 33.3%, the voltage on the positive terminal of storage capacitor 134 is equal to $3/2V_0$.

During segment 5 for both sequences 230 (cf., FIG. 8) and 240 (cf., FIG. 9), primary switch means 140 and second switch means 150 are opened and first switch means 130 is closed. The voltage across primary winding 122 and secondary winding 124 is set at a negative value equal to the voltage $V_C$ across storage capacitor 134, approximately $-V_0/2$. The magnetizing current $I_M$ is diverted away from charging stray capacitor 132 and flows into storage capacitor 134. In the preferred embodiment of the present invention and without loss of generality, the capacitance of storage capacitor 134 is large enough so that the voltage across storage capacitor 134 does not substantially change during segment 5. (The zero-voltage switching on primary switch means 140 and the other benefits of the present invention could be maintained with smaller capacitance values for storage capacitor 134, even though this would cause voltage variations across capacitor 134 during segment 5.) Since a constant negative voltage is being applied to inductor 123 during segment 5, the magnetizing current $I_M$ decreases at a constant rate, thereby acting to reset the transformer core. The duration of segment 5 is sufficiently long that the magnetizing current $I_M$ reverses direction and flows out of storage capacitor 134 into voltage source 110. The magnitude of the current flow $I_M$ out of storage capacitor 134 continues to grow until first switch means 130 opens, at which time segment 6 begins.

In segment 6, the magnetizing current is diverted away from storage capacitor 134 towards stray capacitor 132, where it discharges stray capacitor 132. As a result, the voltage $V_1$ is reduced in value towards zero volts. Unlike converter 3000, the secondary circuit in converter 100 is prevented from interfering with the discharging of stray capacitor 132 since second switch means 150 is opened during segment 6. At the end of segment 6, voltage $V_1$ is decreased to a value of zero volts and primary switch means 140 is closed with a zero-voltage-switching condition to start segment 1. Given the small capacitance value of stray capacitor 132 and the typically large magnitude value of the magnetizing current $I_M$ during segment 6, the magnitude of $I_M$ only decreases slightly during segment 6.

As in forward converter 3000, the time-integrated voltage across inductor 123 should be zero for each switching cycle during the steady-state operation of converter 100 to prevent the core of transformer 120 from saturating. In the steady-state operation of converter 100, the voltage $V_C$ across Capacitor 134 is at a value which sets the time-integrated voltage across inductor 123 to zero during each switching cycle. This value is referred to as the required value for $V_C$ which prevents core saturation and is similar to the required value $V_{CSS}$ determined for forward converter 3000. Given the additional segments present for converter 100, specifically segments 1, 3/3', 4/4' and 6, the calculation of the exact value for $V_{CSS}$ is more complex. In practice, however, the duration of segments 1, 3/3', 4/4' and 6 are extremely small compared to the duration of segments 22' and 5, and the above equation (2) for $V_{CSS}$ in converter 3000 serves as a good approximation for $V_{CSS}$ in converter 100.

To keep the voltage $V_C$ on storage capacitor 134 at the required value $V_{CSS}$ under the conditions of constant input voltage, constant output voltage, and constant output load current, the flow of charge into storage capacitor 134 during the first half of segment 5 must be equal to the flow of charge out of storage capacitor 134 during the second half of segment 5 so that no net accumulation or depletion of charge occurs on storage capacitor 134 during the OFF-period. As discussed above, this same requirement was found for converter 3000. As in converter 3000, the waveform for the magnetizing current $I_M$ in converter 100 under steady-state conditions is centered around a value of zero amperes in order to prevent a net charge accumulation or depletion on storage capacitor 134 during the OFF-period. Otherwise, the voltage $V_C$ would shift away from the required $V_{CSS}$ value.

As found in converter 3000, the voltage $V_C$ and the magnetizing current $I_M$ interact so as to center the $I_M$ waveform around a value of substantially zero amperes. Additionally, the voltage value $V_{CSS}$ for storage capacitor 134 is reached during power-up conditions by transient charging or discharging of storage capacitor 134 in the same manner found in converter 3000. Also, the energy transferred out of storage capacitor 134 during the latter part of segment 5 is recycled to voltage source 110. The reversal of current flow in the magnetizing current $I_M$ though inductor 123 serves to reset the magnetic flux in the transformer's core at a point inside the third quadrant of the transformer's B-H characteristic.

The following exemplary component parameters and operating conditions of converter 100 are provided as an aid in practicing the present invention. In an exemplary embodiment of the present invention, the input voltage ($V_0$) is set at 300 V to deliver $V_{OUT}$ typical output current of 1.0 A at an output voltage $V_{OUT}$ of approximately 100 V. A switching frequency of 400 kHz is used in this exemplary embodiment with a typical duty-cycle of approximately 45%. Primary switch means 140 comprises a field-effect transistor having a breakdown voltage of 800 V and an on-resistance of 3 ohms (part number IRFBE30 from International Rectifier Corporation), first switch means 130 comprises a field-effect transistor having a breakdown voltage of 800 V and an on-resistance of 6 ohms (part number IRFBE20 from International Rectifier Corporation), and second switch means 150 comprises a field-effect transistor having a breakdown of 600 V and an on-resistance of 2.2 ohms (part number IRFBC30 from International Rectifier Corporation). In this exemplary embodiment, storage capacitor 134 ($C_C$) has a capacitance of approximately 2200 pF, stray capacitor 132 ($C_S$) has a capacitance of approximately 140 pF, and transformer 120 has an effective magnetizing inductance ($L_M$ of inductor 123) of approximately 600 $\mu$H. With this value of magnetizing inductance and under the above operating conditions, the magnetizing current has a peak-to-peak value of approximately 0.6 A.

It may now be appreciated that the following modifications of forward converter 100 shown in FIG. 6 are equivalent to the specific topology shown in FIG. 6. First, it may be appreciated that the series combination of storage capacitor 134 and first switch mean 130 may be coupled in parallel with secondary winding 124 instead of primary winding 122. This equivalence is pointed out in U.S. Pat. No. 4,441,146 issued to Vinciarell and shown at 100a in FIG. 6A. The reference numbers of each element of converter 100a comprises the reference number of the corresponding element of converter 100 plus an appended designation "a". In the present invention, the coupling of the ser combination must be placed before second switch means 150. Second, it may be appreciated that the negative terminal of storage capacitor 134 may be coupled to any constant voltage reference, such as ground. Third, it may be appreciated that the positions of storage capacitor 134 and first switch means 130 in the series combination may be reversed. Fourth, it may be appreciated that rectifier 160, choke inductor 170, and output capacitor 172 are not essential in providing zero-voltage-switching conditions for primary switch means 140 and for first switch means 130.

It may be appreciated that switch control means 180 shown in FIG. 6 may comprise a digital microprocessor for generating the control signals for primary switch means 140, first switch means 130, and second switch means 150 according to the timing constraints detailed in Timing Diagram 200 shown in FIG. 7. Given the inductance $L_M$ of the magnetizing inductor 123 and capacitance $C_S$ of stray capacitor 132, the duration of the segments 1, 2/2', 3/3', 4/4', 5 and 6 required for providing zero-voltage switching can be calculated as a function of duty-cycle for the steady-state operation of converter 100. These values may be stored in a conventional memory accessible to the microprocessor and the microprocessor may select the appropriate value for each segment as dictated by the then current value of the duty-cycle.

In a further microprocessor-based embodiment of switch control means 180, it may be appreciated that active voltage sensors may be coupled to primary switch means 140 and first switch means 130 for detecting zero-voltage conditions across their respective switch means. The microprocessor of switch control means 180 may then use this information in setting the duration of segments 3/3', 4/4' and 6 rather than using predetermined stored values for such segments. The advantage of this more active approach is that the zero-voltage-switching conditions may be achieved in transient conditions as well as steady-state conditions. Additionally, the zero-voltage-switching conditions are no longer dependent on knowing the exact values for $L_M$ and $C_{CS}$. As a result, forward converter 100 may be constructed with components having wider parameter ranges and tolerances, leading to higher yields and lower unit costs in the manufacturing of forward converter 100.

Similar benefits may be achieved with the following embodiments of primary switch means 140 and first switch means 130 shown at 540 and 530, respectively, in FIG. 10. Embodiments 540 and 530 are shown in the context of a partial block diagram 500 of forward converter 100, which is shown in FIG. 6. Primary switch means 540 comprises a parallel combination of a rectifier 541 and a switch means 542. Primary switch means 540 is oriented in forward converter 100 such that rectifier 541 conducts a current directed from the negative terminal of voltage source 110 to the positive terminal of voltage source 110 (e.g., the cathode of rectifier 541 is coupled to voltage node $V_1$). Similarly, first switch means 530 comprises a parallel combination of a rectifier 531 and a switch means 532. First switch means 530 is oriented in forward converter 100 such that rectifier 531 conducts a current directed from voltage node $V_1$ to storage capacitor 134 (e.g., the anode of rectifier 531 is coupled to voltage node $V_1$).

With reference to Timing Diagrams 300 and 400 shown in FIGS. 8 and 9, respectively, the following properties of operation for rectifiers 541 and 531 in converter 100 are discussed below. Rectifier 541 conducts current from voltage source 110 to the node $V_1$ when the voltage between node $V_1$ and the negative terminal of voltage source 110 becomes zero or negative. In Timing Diagrams 300 and 400 shown in FIGS. 8 and 9, this condition occurs when voltage $V_1$ is driven to zero volts in segment 6, as shown at points 311 and 313. Thus, the current in primary switch means 540 may be conducted by rectifier 541 during the first part of segment 1 and, possibly, segment 2/2', if switch means 542 is not closed. If switch means 542 remains open, rectifier 541 will continue to conduct current during segments 1 and 6 as long as the primary current, shown at graph 320 in FIG. 8 and 420 in FIG. 9, remains negative. Thus, the incorporation of rectifier 541 with switch means 540 provides a relatively wide window in which switch means 542 may be closed with respect to the opening of first switch means 530.

Likewise, rectifier 531 conducts current from node $V_1$ to the positive terminal of storage capacitor 134 when the voltage at node $V_1$ is equal to or greater than the voltage at the positive terminal of capacitor 134. In Timing diagrams 300 and 400 shown in FIGS. 8 and 9, this condition occurs when the voltage $V_1$ is being driven to a high positive voltage at the end of segments 4/4' by the magnetizing current $I_M$, as shown at 312 and 412, respectively. Thus, if switch means 532 is not closed, the current in first switch means 530 may be conducted by rectifier 531 during the first part of segment 5 since the direction of the magnetizing current is the same as the conducting direction of rectifier 531, as shown at graphs 330,340 and 430,440 in FIGS. 8 and 9. If switch means 532 remains open during segment 5, rectifier 531 will continue to conduct the current through first switch means 530 until the magnetizing current $I_M$ reverses direction half-way through segment 5, assuming steady-state operating conditions. The closing of switch means 532 may then be delayed until the midpoint of segment 5, assuming steady-state operating conditions. Thus, the incorporation of rectifier 531 with switch means 530 provides a relatively wide window in which switch means 532 may be closed with respect to the opening of primary switch means 540.

In a broader viewpoint, rectifier 531 comprises means for detecting a zero-voltage-switching condition across first switch means 530 and means for initially conducting current through switch means 530 upon the occurrence of a zero-voltage-switching condition across switch means 530. Likewise, rectifier 541 comprises means for detecting a zero-voltage-switching condition across primary switch means 540 and means for initially conducting current through switch means 540 upon the occurrence of a zero-voltage-switching condition across switch means 540. As such, in this embodiment the timing for the closing of switch means 532 and switch means 542 is not as critical. The detecting and conducting means provided by rectifiers 531 and 541 may be used in a number of ways, as described below.

First, first switch means 530 and primary switch means 540 may be controlled by the microprocessor-based implementation of switch control means 180 discussed above, which determines the length of each segment as a function of the duty-cycle. In this embodiment, switch means 542 of primary switch means 540 is operated as shown in graph 205 in FIG. 7 and switch means 532 of first switch means 530 is operated as shown in graph 210 in FIG. 7. This implementation would ensure zero-voltage-switching conditions for steady-state operating conditions and for some, but not all, transient conditions and parameter variations. More specifically, zero-voltage switching would occur for those transient conditions and parameter variations which would normally lead to a negative-voltage-switching condition on primary switch means 140 and positive-voltage-switching condition on first switch means 130 since rectifiers 541 and 531 would conduct under these conditions. Zero-voltage switching would not occur for those transient conditions and parameter variations which would normally lead to a positive-voltage-switching condition on primary switch means 140 and a negative-voltage-switching condition on first switch means 130, since rectifiers 541 and 531 would not conduct under these conditions. In these latter cases, the magnetizing current is not large enough in magnitude to reduce the voltage across switch means 530 and 540 to zero volts in the time interval segment allowed.

Second, by extending the amount of time for the magnetizing current to reduce the voltage across first switch means 530 to zero volts during segments 3 and 4/4' and the voltage across primary switch means 540 during segment 6, zero-voltage-switching can occur for the above latter cases. This may be accomplished by increasing the delay in closing switch means 532 (first switch means 530) after the opening of primary switch means 540, which is normally equal to the sum of segments 3 and 4/4', and by increasing the delay in closing switch means 542 (primary switch means 540) after the opening of first switch means 530, which is normally equal to the duration of segment 6. Under steady-state conditions and with parameter values at their target values, the increase of the delay in closing switch means 532 causes rectifier 531 to conduct and to initiate segment 5. Likewise, the increase of the delay in closing primary switch means 542 causes rectifier 541 to conduct and initiate segment 1. In this way, zero-voltage switching can occur in switch means 530 and 540 over a greater range of transient conditions and parameter variations.

Given the above exemplary use of switch means 530 and 540, it may be appreciated that switch means 530 and 540 may be used with an embodiment of switch control means 180 which is less complex than the above referenced microprocessor-based embodiment.

In another embodiment of the present invention, the delay in closing switch means 542 (primary switch means 540) after the opening of switch means 532 (first switch means 530) is set to a predetermined, fixed value. Since a fixed delay value is used, the calculation facilities of a microprocessor are no longer needed and less complex circuitry may be used for this exemplary embodiment of switch control means 180. The fixed delay value is applicable to a predetermined range of duty-cycles and is set to the longest time duration for segment 6 in the given range of duty-cycles. Assuming a steady-state operation for converter 100, the longest duration for segment 6 occurs for the lowest duty-cycle in the given range. Operating at the lowest duty-cycle value in the range, rectifier 541 begins to conduct at the same point switch means 542 is closed. As the duty-cycle increases with respect to the lowest value, rectifier 541 conducts prior to the closing of switch means 542 and provides for zero-voltage switching for primary switch means 540.

Likewise, the delay in closing switch means 532 (first switch means 530) after the opening of switch means 542 (first switch means 540) may be set to a predetermined, fixed value for a predetermined range of duty-cycles. In the case of sequence 230, shown in FIG. 7, the fixed delay value is set to the longest time duration of the sum of segments 3 and 4 in the given range of duty-cycles. Assuming a steady-state operation for converter 100, the longest duration for the sum of segments 3 and 4 occurs for the lowest duty-cycle in the given range. In the case of sequence 240, shown in FIG. 7, the fixed delay value is set to the longest time duration of segment 4' in the given range of duty-cycles. Assuming a steady-state operation for converter 100, the longest duration for segment 4' also occurs for the lowest duty-cycle in the given range. Operating at the lowest duty-cycle value in the range, rectifier 531 begins to conduct at the same point switch means 532 is closed. As the duty-cycle increases with respect to the lowest value, rectifier 531 conducts prior to the closing of switch means 532 and provides for zero-voltage switching for primary switch means 530.

It may be appreciated that given Timing Diagram 200 shown in FIG. 7, a practitioner of ordinary skill would be able to construct an embodiment of switch control means 180 which provides such fixed delay periods as described above. Such an fixed-delay embodiment of switch control means 180 is shown at 600 in FIG. 11. Switch control means 600 comprises an input port 601 for receiving a pulse-width modulated (PWM) duty-cycle signal, an output port 610 for providing a control signal for primary switch means $S_{PR}$ (540 or 140), an output port 611 for providing a control signal for first switch means S₁ (530 or 130), and an output port 612 for providing a control signal for second switch means S₂ (550 or 150). The input PWM duty-cycle signal to port 601 may be generated by means well known to the power-supply switching art and an illustration of such means is not necessary in order to understand the present invention and enable one of ordinary skill in the art to make and use the present invention. For example, the signal applied to port 601 may be generated by the UC1825 High Speed PWM Controller integrated circuit manufactured by Unitrode Integrated Circuits Corporation. The UC1825 Controller compares the voltage of the load, such as load 174 in FIG. 6, against a predetermined target value and varies the duty cycle of its PWM output signal so as to keep the voltage of the load at the target value.

Control means 600 further comprises two two-input NOR gates 620 and 630, an inverter 640, and three delay units 650, 660, and 670. The duty-cycle signal at input port 601 is coupled to an input of NOR gate 620 and, via inverter 640, to an input of NOR gate 630. The output of NOR gate 620 is coupled to the other input of NOR gate 630 via delay unit 660. The output of NOR gate 630 is coupled to the other input of NOR gate 620 via delay unit 650. The output of NOR gate 630 provides the control signal for primary switch means $S_{PR}$ (shown at 540 in FIG. 10 and at 140 in FIG. 6) and the output of NOR gate 620 provides the control signal for first switch means S₁ (shown 530 in FIG. 10 and at 130 in FIG. 6). The coupling of NOR gates 620, 630, delay units 650, 660, and inverter 640 in the above described manner comprise means well known in the digital clocking art for generating two non-overlapping clock signals (ports 610 and 611) from a single input clock signal (port 601).

In operation, the signal value at port 610 follows the signal value at input port 601 and the signal value at port 611 follows the inversion of the signal value at input port 601. The signal transition at port 610 from a logic-high level to a logic-low level (falling edge) follows the falling edge transition at input port 601 with substantially no delay. This is because the output of delay unit 660 is at a logic-low level prior to this transition, thus allowing the output signal from inverter 640 to determine the output of NOR gate 630. The signal transition at port 610 from a logic-low level to a logic-high level (rising edge) follows the rising edge transition at input port 601 with a delay substantially determined by delay unit 660 (delay unit 2). This is because both input signals to NOR gate 630 are both at logic-high levels just prior to the rising edge transition at port 601 and both inputs of NOR gate 630 must be at logic-low levels to cause a rising edge transition at port 610, with the last input of NOR gate 630 being changed to a logic-low level by delay unit 660.

In a complimentary manner, the signal transition at port 611 from a logic-high level to a logic-low level (falling edge) follows the rising edge transition at input port 601 with substantially no delay. This is because the output of delay unit 650 is at a logic-low level prior to this transition, thus allowing the signal at input port 601 to determined the output of NOR gate 620. The signal transition at port 611 from a logic-low level to a logic-high level (rising edge) follows the falling edge transition at input port 601 with a delay substantially determined by delay unit 650 (delay unit 1). This is because both input signals to NOR gate 620 are both at logic-high levels just prior to the falling edge transition at port 601 and both inputs of NOR gate 620 must be at logic-low levels to cause a rising edge transition at port 611, with the last input of NOR gate 620 being changed to a logic-low level by delay unit 650. In this manner, non-overlapping control signals are generated at output ports 610 and 611 with a delay $D_1$ (determined by delay unit 650) occurring between the falling edge of the signal at port 610 and the rising edge of the signal at port 611 and a delay D2 (determined by delay unit 660) occurring between the falling edge of the signal at port 611 and the rising edge of the signal at port 610. In this manner, fixed delays can be introduced between the closing and opening of primary switch means 540 (or 140) and first switch means 530 (or 130).

It may be appreciated that port 601 comprises means for receiving a PWM duty cycle signal generated by standard control means in the switching power supply art. It may be further appreciated that NOR gates 620, 630, delay units 650,660, and inverter 640 comprise means, responsive to the received duty cycle signal, for generating a first control signal at port 610 which directs the operation of the primary switch means and a second control signal at port 611 which directs the operation of the first switch means. It may be further appreciated that each of the first and second control signals have a first state (logic-high level) indicating that its respective switch means is to be closed and a second state (logic-low level) indicating that its respective switch means is to be open. Furthermore, the first and second control signals are generated such that only one of the control signals is in the first state (logic-high level) and are referred to as "non-overlapping" signals.

For generating the control signal for secondary switch means S₂ shown at 550 in FIG. 10 (or at 150 in FIG. 6), control means 600 further comprises a delay unit 670 coupled between the output of NOR gate 630 and output port 612. The control signal for primary switch means $S_{PR}$ propagates through delay unit 670, thus generating a control signal for second switch means S₂ which follows the control signal for primary switch means $S_{PR}$ and is delay by a fixed amount. In this manner, control means 600 provides a switching sequence similar to sequence 230 shown in FIG. 7.

It may be appreciated that delay unit 670, as coupled to NOR gate 630, comprises means for generating a third control signal at port 612 to direct the operation of second switch means S₂. It may be further appreciated that the logic-low level state of the third control signal comprises a first state indicating that second switch means S₂ is to be closed (logic-high level) and that the logic-high level state of the third control signal comprises a second state indicating that second switch means S₂ is to be opened. Further, the third control signal enters its first state (logic-high level) a predetermined time duration after the first control signal at port 610 enters its first state, and the third control signal at port 612 enters its second state (logic low level) a predetermined time duration after the first control signal at port 610 enters its second state.

It may be appreciated that a number of means for implementing each of the delay units 650, 660 and 670 are well known in the art and may be used for this purpose. As an example, such a delay unit may comprise a first digital inverter having its input as the input of the delay unit and its output coupled to the input of a second digital inverter, the output of the second inverter being the output of the delay unit. The delay introduced by this delay unit would be equal to the sum of the propagation delays of the two digital inverters. Such an exemplary delay unit may further comprise a standard RC delay circuit coupled between the output of the first digital inverter and the input of the second digital inverter for introducing addition delay time, if required.

A further object of the present invention is to provide a switch control means for the second switch means S₂ (150 or 550) of the present invention which is autonomous from the switch control means for primary switch means 140 and first switch means 130, shown in FIG. 6. As will be made apparent below, the autonomous feature of the switch control means for second switch means 150 provides greater manufacturing flexibility and circuit robustness. Such an exemplary autonomous switch control means is shown at 730 in FIG. 12. In addition, an exemplary embodiment of second switch means 150 is shown at 750 in FIG. 12. Embodiments 730 and 750 are shown in the context of a partial block diagram 700 of forward converter 100, which is shown in FIG. 6.

The present invention recognizes that a control signal for controlling second switch means 150 may be derived from the voltage across secondary winding 124 in the following manner. Referring back to timing diagram 300 shown in FIG. 8, it may be seen that for switching sequence 230 (of FIG. 7), the voltage waveform $V_S$ for secondary winding 124 crosses zero volts, as indicated at a point 314 in FIG. 8, at substantially the same time secondary switch means 150 is closed. The zero crossing occurs as $V_S$ changes from a positive value to a negative value and is referred to as a negative transition due to the negative slope of the $V_S$ waveform. It may be further seen from timing diagram 300 that secondary switch means 150 thereafter opens a time duration after the voltage waveform $V_S$ for secondary winding 124 crosses zero volts, indicated at a point 315 in FIG. 8, as $V_S$ changes from a negative value to a positive value. This is referred to as a positive transition due to the positive slope of the $V_S$ waveform.

In the case of switching sequence 230, it may then be appreciated that secondary switch means 150 may be controlled in response to the voltage $V_S$ of secondary winding 124 by detecting the transitions of the $V_S$ waveform with respect to a predetermined voltage value, e.g., zero volts, and by directing second switch means 150 to open a short time (short time duration) after voltage $V_S$ makes a negative transition through the predetermined voltage value and to close a somewhat longer time (longer time duration) after voltage $V_S$ makes a positive transition through the predetermined voltage value. The length of the second duration may be chosen (i.e., made large enough) such that second switch means 150 is closed after primary switch means 140 closes for a wide range of duty-cycles and load conditions.

In this manner, a switch control means may be constructed for second switch control means 150 which may be autonomous from the switch control means for primary switch means 140 and first switch means 130. Such an autonomous switch control means is provided by switch control means 730 shown in FIG. 12.

Autonomous switch control means 730 comprises a series combination of a resistor 732 and a Zener diode 734 which is coupled in parallel across secondary winding 124. The cathode terminal of Zener diode 734 is coupled to a node 738 and the anode terminal of Zener diode 734 is connected to the negative terminal of secondary winding 124, which serves as a secondary-side ground. Resistor 732 is connected between the positive terminal of secondary winding 124 and node 738. Additionally, a rectifier 736 is coupled in parallel with Zener diode 734 with its cathode terminal coupled to the secondary-side ground.

In operation, a positive voltage of, for example, 4.8 V is generated at node 738 by Zener diode 734 when a positive potential appears across secondary winding 124 to direct current towards load 174. When a negative voltage appears across secondary winding 124, a negative voltage of approximately −0.6 V is generated at node 734 by rectifier 736. As such, it may be appreciated that resistor 732, diode 734, and rectifier 736 comprise detection means for detecting the voltage across secondary winding 124 and for generating a signal at node 738 having a first state (4.8 V, logic high) when the voltage across secondary winding 124 is positive and a second state (−0.6 V, logic low) when the voltage across secondary winding 124 is negative.

Autonomous switch control means 730 further comprises a delay generation means responsive to the signal at node 738 for generating a switch control signal at a node 746 to control second switch means 750. As discussed below in greater detail, the control signal at node 746 has a first state (logic-high) for directing second switch means 750 to close and a second state (logic low) for directing second switch means 750 to open. The delay generation means comprises a first inverter 740 having an input coupled to node 738 and an output, a second inverter 745 having an input coupled to the output of first inverter 740 and an output terminal coupled to node 746 for providing the control signal. Inverters 740 and 745 are powered by the potential difference between a conventional digital $V_{CC}$ supply (for example +5 V) and the secondary-side ground. As such, the outputs of inverters 740 and 745 have a logic low state at around zero volts and a logic high state at around $V_{CC}(+5)$ volts. In addition, inverter 745 preferably comprises a Schmitt trigger input, as described below in greater detail.

The delay generation means of control means 730 further comprises a delay means having a rectifier 741, a resistor 742 and a capacitor 744 for introducing first and second predetermined time delays into the signal propagation between first inverter 740 and second inverter 745. Specifically, the delay means introduces a first predetermined signal propagation delay between first inverter 740 and second inverter 745 when the output of inverter 740 makes a transition from a logic-low level to a logic-high level. Additionally, the delay means introduces a second predetermined signal propagation delay between first inverter 740 and second inverter 745 when the output of inverter 740 makes a transition from a logic-high level to a logic-low level.

In the delay means, the anode terminal of rectifier 741 is connected to the output of inverter 740 and the cathode terminal of rectifier 741 is connected to the input of inverter 745 at a node 743. Capacitor 744 is coupled between the input of inverter 745 and ground and resistor 742 is also coupled between the input of inverter 745 and ground.

When the output of inverter 740 makes a transition from a logic-low level to a logic-high level, rectifier 741 conducts and current from inverter 740 charges capacitor 744 to raise the voltage at node 743. The component values of rectifier 741, resistor 742, and capacitor 744 are chosen in a manner well known in the art such that the voltage at node 743 rises to a logic-high value in a time duration which is relatively short with respect to the switching cycle time. This provides the above first predetermined signal propagation delay.

When the output of inverter 740 makes a transition from a logic-high level to a logic-low level, rectifier 741 blocks current from flowing from capacitor 744 into inverter 740 and, as such, the charge on capacitor 744 supporting the voltage on node 743 is discharged to ground by resistor 742. The component values of resistor 742 and capacitor 744 are chosen in a manner well known in the art such that the voltage at node 743 falls to a logic-low level in a time duration which is relatively longer than the rise time duration for the voltage at node 743. This provides the above second predetermined signal propagation delay.

Given the slow rise time at node 743, it may be appreciated that the use of a Schmitt trigger at the input of inverter 745 (i.e., a Schmitt triggered inverter) would improve the output switching characteristics of inverter 745. It may also be appreciated that means other than rectifier 741, resistor 742, capacitor 744, and the particular arrangement of these components may by used to provide the first and second predetermined propagation delays.

The control signal at node 746 tracks the detected signal at node 738 and is delayed with respect the signal at node 738 by one of two predetermined time durations, the time duration being selected by the direction of the logic transition (positive transition and negative transition). As a result, the control signal at node 746 enters its first state (logic-high level) a first predetermined time duration after the signal at node 738 enters its first state (logic-high level), the first predetermined time duration being related to the second (longer) signal propagation delay generated by resistor 742 discharging capacitor 744. Further, the control signal at node 746 enters its second state (logic-low level) a second predetermined time duration after the signal at node 738 enters its second state (logic-low level), the second predetermined time duration being related to the first (shorter) signal propagation delay generated by the charge of capacitor 744 through rectifier 741. The control signal generated at node 746 in this way is provided to secondary switch means 750 via a coupling means including a coupling transformer 780, as discussed below in greater detail.

Also shown in FIG. 12 is an exemplary embodiment 750 of second switch means 150. Second switch means 750 comprises an n-channel enhancement-type field effect transistor 752 having a gate terminal, a drain terminal connected to secondary winding 124, and a source terminal coupled to node $V_2$ shown in FIG. 6. To drive transistor 752, the coupling means of switch control means 730 further comprises a coupling transformer 780 having a first winding 782 and a second winding 784. First winding 782 has a first terminal coupled to node 746 for receiving the switch control signal and a second terminal coupled to the secondary-side ground. Second winding 784 has a first terminal coupled to the gate of transistor 752 and a second terminal coupled to the source of transistor 752. The magnetic reference convention for transformer 780 is such that a reference dot appears at the first terminals of windings 782 and 784.

The configuration of transformer 780 in this manner provides means for translating the potential voltage generated at node 746 to a potential difference generated across the gate and source terminals of, transistor 752. As a result, transistor 752 conducts current between its drain and source terminals when the control signal at node 746 is in its first stage (logic-high level) since the positive voltage at node 746 is translated by transformer 780 to provide a positive gate-to-source voltage for transistor 752. Additionally, transistor 752 blocks current between its drain and source terminals when the control signal at node 746 is in its second state logic-low level) since the logic-low voltage at node 746 is translated by transformer 780 to provide a slightly negative gate-to-source voltage for transistor 752. It may thus be appreciated that transformer 780 comprises means for coupling the control signal at node 746 to transistor 752 of second switch means 750.

As is well known to the transformer coupling art, a resistor 786 may be included in series with second winding 784 to damp any oscillations that may occur by any resonance formed by the gate capacitance of transistor 752 and the leakage inductance of second winding 784.

In second switch means 750, field effect transistor 752 may further include a parasitic substrate diode, as indicated at 754 in FIG. 12. The inclusion of parasitic substrate diode 754 depends upon the particular transistor component used for transistor 752. If parasitic substrate diode 754 exists as part of field effect transistor 752, an undesired current will be conducted from the source terminal to the drain terminal when a negative drain-to-source voltage is applied across transistor 752. To block this undesired current, a blocking rectifier 756 coupled in series between the drain terminal of transistor 752 and secondary winding 124 may be included. As shown in FIG. 12, blocking rectifier 756 is oriented such that current conducted by parasitic substrate diode 754 is prevented from entering secondary winding 124. If transistor 752 does not include parasitic substrate diode 754, the blocking rectifier may be removed so as to directly couple the drain of transistor 752 to secondary winding 124.

While the invention has been described in connection with what is presently considered to be the most practical and preferred embodiments, it is to be understood that the present invention is not limited to the disclosed embodiments but, on the contrary is intended to cover various modifications and equivalent arrangements included within the scope of the appended claims.

What is claimed is:

1. In a power converter having a transformer including a primary winding and a secondary winding, said secondary winding coupled to an output load, and having a primary switch means connected in series between said primary winding and a voltage source, said primary switch means when closed causing a first portion of energy from said voltage source to be coupled through said transformer to said load by means of said secondary winding and causing a second portion of said energy to be stored in said transformer, said energy stored in said transformer being released from said transformer when said primary switch means is thereafter opened, circuitry for utilizing the energy stored in said transformer to reset the core of said transformer during the time said primary switch means is open and to minimize the voltage stress on said primary switch means when said primary switch means closes, said circuitry comprising:

a storage capacitor;

a first switch means coupled in series with said storage capacitor, the series combination of said storage capacitor and said first switch means coupled in parallel with one of said transformer windings;

a second switch means coupled in series with said secondary winding of said transformer; and a switch control means for operating said first and second switch means in relation to the operation of said primary switch means, said switch control means closing said first switch substantially when said primary switch means opens and opening said first switch means prior to when said primary switch means closes to create a zero-voltage switching condition on said primary switch means when said primary switch means next is caused to close, said switch control means opening said second switch means substantially when said primary switch means opens and closing said second switch means substantially when said primary switch means closes, said second switch means being operated such that substantially no current is conducted by said secondary winding during the interval after said first switch means is opened and before said primary switch means is closed.

2. The circuitry of claim 1 wherein said switch control means closes said first switch means after said primary switch means opens and before the energy stored in said transformer is discharged.

3. The circuitry of claim 1 wherein said switch control means opens said second switch means after said primary switch means opens and before said first switch means is closed.

4. The circuitry of claim 1 wherein said switch control means opens said second switch means before said primary switch means opens, such that the current is said primary winding is reduced before said primary switch means opens.

5. The circuitry of claim 1 wherein said switch control means closes said second switch means after said primary switch means closes such that said primary switch means become completely conductive before said primary switch means conducts the current of said secondary winding which is reflected to said primary winding by the transformer action of said transformer.

6. The circuitry of claim 1 wherein said primary switch means comprises:
   a switch connected in series between said primary winding and said voltage source, said switch responsive to said switch control means; and
   means coupled in parallel with said switch for detecting a zero voltage switching condition across said primary switch means and for conducting current upon the detection of said zero voltage switching condition across said primary switch means.

7. The circuitry of claim 6 wherein said voltage source includes a positive terminal and a negative terminal and wherein said means for detecting a zero voltage switching condition across said primary switch means comprises a rectifier having an anode terminal and a cathode terminal, said rectifier connected in parallel with said primary switch means such that said rectifier conducts current directed toward said positive terminal of said voltage source.

8. The circuitry of claim 1 wherein said switch control means closes said first switch means after said primary switch means opens and after the potential difference across said first switch means is substantially zero volts to create a zero-voltage switching condition across said first switch means.

9. The circuitry of claim 8 wherein said first switch means comprises:
   a switch coupled in series with said storage capacitor, the series combination of said storage capacitor and said switch coupled in parallel with said one of said transformer windings; and
   means coupled in parallel with said switch for detecting a zero voltage switching condition across said first switch means and for conducting current upon the detection of said zero voltage switching condition across said first switch means.

10. The circuitry of claim 9 wherein said means for detecting a zero voltage switching condition across said first switch means comprises a rectifier coupled in parallel with said switch of said first switch means such that said rectifier conducts the magnetizing current released from said transformer winding into said storage capacitor when said primary switch means is opened.

11. The circuitry of claim 1 wherein said series combination of said first switch means and said storage capacitor is coupled in parallel with said primary winding.

12. The circuitry of claim 1 wherein said series combination of said first switch means and said storage capacitor is coupled in parallel with said secondary winding.

13. The circuitry of claim 1 further comprising a first capacitor having a first terminal coupled between said primary winding and said primary switch means and a second terminal coupled to a fixed potential reference.

14. The circuitry of claim 13 wherein said primary winding includes a paralytic capacitance, said primary switch means includes a parasitic capacitance, said first switch means includes a parasitic capacitance, and wherein said firs capacitor comprises said parasitic capacitances of said primary winding, said primary switch means, and said first switch means.

15. The circuitry of claim 1 wherein said power converter further comprises:
   a choke inductor coupled in series with said load, the series combination of said choke inductor and said load being coupled in parallel with the series combination of said second switch means and said secondary winding;
   a rectifier coupled in parallel with said series combination of said choke inductor and said load, said rectifier for coupling current from said choke inductor to said load when said second switch means is open; and
   an output capacitor coupled in parallel with said load.

16. The circuit of claim 1 wherein said switch control means comprises:
   means for receiving a duty cycle signal; and
   means responsive to said duty cycle signal for generating a first control signal for controlling the operation of said primary switch means and a second control signal for controlling the operation of said first switch means, each of said first control signal and said second control signal having a first state for directing its respective switch means to close and a second state for directing its respective switch means to open, said first and second control signals generated such that only one of said first and second control signals is in its respective said first state at any given time.

17. The circuitry of claim 16 further comprising means for generating a third control signal for controlling the operation of said second switch means, said third control signal having a first state for directing said second switch means to close and a second state for directing said second switch means to open, said third control signal entering said first state a predetermined time duration after said first control signal enters its said first state, said third control signal entering said second state a predetermined time duration after said first control signal enters its said second state.

18. The circuitry of claim 1 wherein said switch control means comprises means for controlling said second switch means comprising:
   detection means for detecting the voltage across said secondary winding and for generating a first signal having a first state when the voltage across said secondary winding is positive and a second state when the voltage across said secondary winding is negative;
   delay generation means responsive to said first signal for generating a switch control signal to control said second switch means, said switch control signal having a first state for directing said second switch means to close and a second state for directing said second switch means to open, said switch control signal entering said first state a first predetermined time duration after said first signal enters its first state and entering said second state a second predetermined time duration after said first signal enters its second state; and
   coupling means for coupling said switch control signal to said second switch means.

19. The circuitry of claim 18 wherein said first predetermined time duration is longer than said second predetermined time duration.

20. The circuitry of claim 18 wherein said detection means comprises a series combination of a resistor and a Zener diode, said Zener diode having an anode terminal and a cathode terminal, said resistor having a first terminal and a second terminal coupled to said cathode terminal of said Zener diode, said series combination coupled across said secondary winding such that a positive voltage is produced at said cathode terminal of said Zener diode when said secondary winding provides current to said load, said first signal being provided at said cathode terminal of said Zener diode.

21. The circuitry of claim 20 wherein said detection means further comprises a rectifier coupled in parallel with said Zener diode, said rectifier having a anode terminal connected to said anode terminal of said Zener diode and a cathode terminal connected to the cathode terminal of said Zener diode.

22. The circuitry of claim 18 wherein said delay generation means comprises:
   a first inverter having an input coupled to said first signal and an output, said output having a logic high state and a logic low state;
   a second inverter having an input coupled to said output of said first inverter and an output for providing said switch control signal for said second switch means; and
   delay means for introducing a first signal propagation delay between said first and second inverters when said output of said first inverter changes from its said logic low state to its said logic high state and for introducing a second signal propagation delay between said first and second inverters when said output of said first inverter changes from its said logic high state to its said logic low state, said first and second signal propagation delays such that said switch control signal enters its said first state said first predetermined time duration after said first signal enters its first state and said switch control signal enters its said second state said second predetermined time duration after said first signal enters its second state.

23. The circuitry of claim 22 wherein said delay means comprises:
   a rectifier having an anode terminal connected to said output of said first inverter and a cathode terminal connected to said input of said second inverter;
   a capacitor having a first terminal connected to said input of said second inverter and a second terminal coupled to a fixed potential reference; and
   a resistor having a first terminal connected to said input of said second inverter and a second terminal coupled to said fixed potential reference.

24. The circuitry of claim 18 wherein said second switch means comprises a field effect transistor having a gate terminal, a drain terminal connected to said secondary winding, and a source terminal coupled to said load, and wherein said coupling means for coupling said control signal to said second switch means comprises a coupling transformer having a first winding coupled to said control signal and a second winding having a first terminal coupled to said gate terminal and a second terminal coupled to said source terminal.

25. The circuitry of claim 24 wherein said coupling means for coupling said control signal to said second switch means further comprises a resistor coupled in series between said gate terminal and said second terminal of said second winding.

* * * * *

UNITED STATES PATENT AND TRADEMARK OFFICE
CERTIFICATE OF CORRECTION

PATENT NO. : 5,173,846
DATED : December 22, 1992
INVENTOR(S) : David A. Smith

It is certified that error appears in the above-identified patent and that said Letters Patent is hereby corrected as shown below:

In the Abstract, line 6, "second" should be —secondary—.
In column 3, line 34, "period," should be —periods—.
In column 6, line 1, "V" should be —$V_1$—.
In column 8, line 11, "=$T_ON$/" should be —=$T_{ON}$/—.
In column 8, line 16, "OFF- period" should be —OFF-period—.
In column 11, line 65, "102" should be —1026—.
In column 13, line 65, "303" should be —3034—.
Column 14, line 61,(1st occurrence) of "designed" should be deleted.
In column 15, line 43, "302" should be —3024—.
In column 17, line 23, "$V_0$At" should be —$V_0$. At—.
In column 19, line 52, "LOUT" should be —$L_{OUT}$—.
Col. 24, line 24, "22'" should be —2/2'—
In column 25, line 15, "2," should be —2'—.
In column 25, line 16, "2," should be —2'—.
In column 27, line 1, "$V_{OUT}$" should be —a—.
In column 27, line 2, "$V_{OUT}$" should be —($V_{OUT}$)—.
In column 27, line 37, "ser" should be —series—.
In column 29, line 55, "segment" should be —(segment)—.
In column 32, line 6, "$D_1$" should be —D1—.
In column 37, line 31, "is" should be —in—.
In column 38, line 30, "paralytic" should be —parasitic—.

UNITED STATES PATENT AND TRADEMARK OFFICE
CERTIFICATE OF CORRECTION

PATENT NO. : 5,173,846
DATED      : December 22, 1992
INVENTOR(S): David A. Smith It is certified that error appears in the above-indentified patent and that said Letters Patent is hereby corrected as shown below:

Column 38, line 49, "circuit" should be --circuitry--.

Signed and Sealed this

Seventh Day of December, 1993

Attest:

BRUCE LEHMAN

Attesting Officer

*Commissioner of Patents and Trademarks*